United States Patent [19]

Kato et al.

[11] Patent Number: 5,611,987
[45] Date of Patent: Mar. 18, 1997

[54] PROCESS FOR PRODUCING BIAXIALLY DRAWN PLASTIC BOTTLES HAVING EXCELLENT HEAT RESISTANCE

[75] Inventors: Nobuyuki Kato; Kenji Matsuno; Yoshitsugu Maruhashi, all of Yokohama; Hideo Kurashima, Yokosuka; Hiroo Ikegami, Sagamihara; Setsuko Iida, Yokohama; Kimio Takeuchi, Kawasaki, all of Japan

[73] Assignee: Toyo Seikan Kaisha, Ltd., Tokyo, Japan

[21] Appl. No.: 281,686

[22] Filed: Jul. 28, 1994

[30] Foreign Application Priority Data

Jul. 28, 1993 [JP] Japan .................................. 5-185684

[51] Int. Cl.⁶ .................................................. B29C 49/12
[52] U.S. Cl. .................. 264/458; 264/521; 264/529; 264/531; 264/532; 264/906; 425/526; 425/529
[58] Field of Search ........................ 264/458, 521, 264/529, 530, 531, 532, 906; 425/526, 529, 530

[56] References Cited

U.S. PATENT DOCUMENTS

| | | |
|---|---|---|
| 4,547,333 | 10/1985 | Takada ..................................... 264/531 |
| 4,790,741 | 12/1988 | Takakusaki et al. . |
| 5,128,091 | 7/1992 | Agur . |
| 5,308,233 | 5/1994 | Denis et al. ............................ 264/906 |

FOREIGN PATENT DOCUMENTS

| | | |
|---|---|---|
| 0086652 | 8/1983 | European Pat. Off. . |
| 0237459 | 9/1987 | European Pat. Off. . |
| 0425360 | 5/1991 | European Pat. Off. . |
| 0559103 | 9/1993 | European Pat. Off. . |
| 0571262 | 11/1993 | European Pat. Off. . |
| 2550990 | 3/1985 | France . |
| 63-122516 | 5/1988 | Japan ..................................... 264/906 |
| 2004805 | 4/1979 | United Kingdom . |
| 2138735 | 10/1984 | United Kingdom . |

Primary Examiner—Catherine Timm
Attorney, Agent, or Firm—Sughrue, Mion, Zinn, Macpeak & Seas

[57] ABSTRACT

A process for producing biaxially drawn plastic bottles having excellent heat resistance and an apparatus therefor. The process comprises a step of biaxially drawing and free blow-molding the preformed article to obtain a secondary molded article thereof, a step of heating the secondary molded article by inserting it for 0.3 to 5 seconds in the infrared rays emitted from an infrared-ray radiation member that has a substantially planar radiation surface having a height larger than that of the secondary molded article in the direction of height and having a surface temperature of from 350° C. to 1000° C., in order to obtain a tertiary product thereof that is shrunk, and a step for blow-molding the tertiary product that is in a heated state in a metal mold to obtain a final molded article. A single metal mold is used for blow-molding to shorten the time occupied by the metal mold and to produce the bottles having excellent heat resistance maintaining high productivity.

10 Claims, 15 Drawing Sheets

F I G. 6
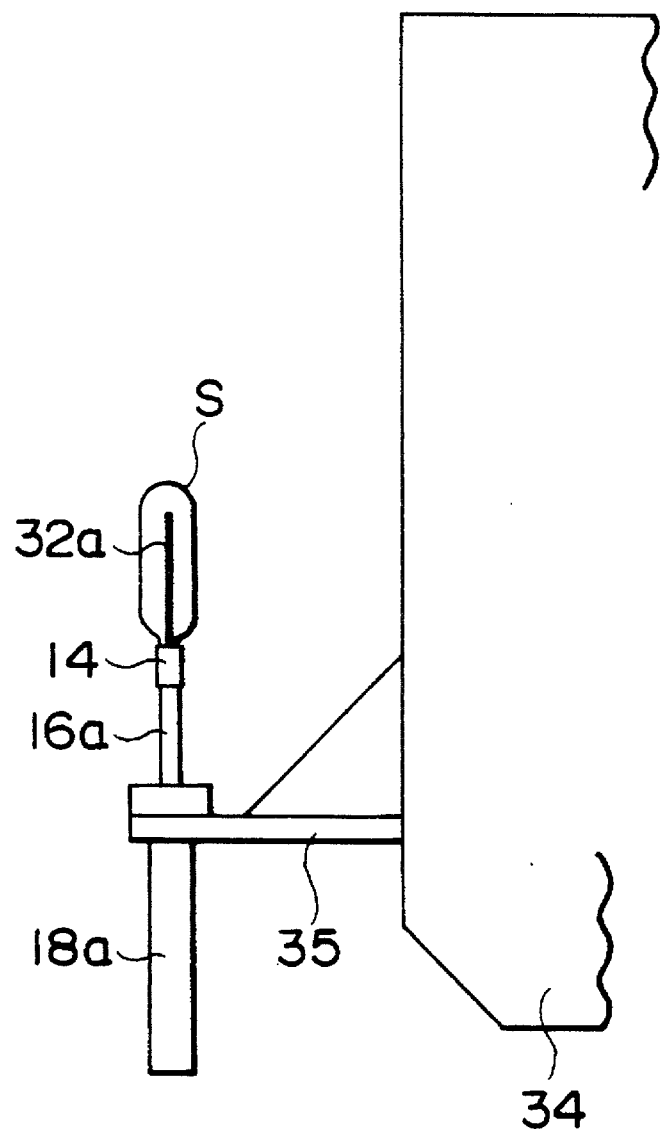

PROCESS FOR PRODUCING BIAXIALLY DRAWN PLASTIC BOTTLES HAVING EXCELLENT HEAT RESISTANCE

BACKGROUND OF THE INVENTION (1) Field of the Invention

The present invention relates to a process for producing biaxially drawn plastic bottles having excellent heat resistance capable of retaining their shapes during the periods in which they are filled with liquids of high temperatures or during the heat treatment for sterilizing the contents.

(2) Description of the Prior Art

A process has been known in which a secondary molded article obtained by biaxially drawing and blow-molding a preformed article is heat-treated (thermally set) and the heat-treated article is finally blow-molded in a mold in order to impart heat resistance to the biaxially drawn plastic bottles, so that they can withstand filling of liquids of high temperatures or the step of sterilizing the contents.

According to, for instance, Japanese Patent Publication No. 39416/1992, the barrel of an intermediate container obtained by blow-molding a preformed article is heated at 180° to 220° C. for 1 to 15 minutes to effect the heat crystallization and, in this case, the heating is accomplished in an atmosphere or by the hot air of 180° to 220° C.

According to Japanese Laid-Open Patent Publication No. 78728/1988, a step of thermal shrinking is provided between the step of final draw-molding and the step of primarily draw-molding the preform or the step of deforming the bottom, and in FIG. 9 thereof is shown a method of thermally shrinking the barrel of an intermediate container obtained by blow-molding a preformed article by using a plurality of linear heaters that are combined together maintaining a suitable gap.

Moreover, Japanese Laid-Open Patent Publication No. 122516/1988 teaches effecting the first stage of draw-molding based on a free blow-molding without using metal mold and effecting the intermediate heating by using an infrared ray heater in the step of effecting two stages of draw-molding and in the step of intermediate thermal shrinking.

According to the conventional method of effecting two stages of draw-molding and the intermediate thermal shrinking, however, the temperature for heat-treating the intermediate molded particle tends to become locally uneven causing the final product to exhibit insufficient heat resistance. Moreover, the heat treatment is carried out requiring an extended period of time. Therefore, the residence time becomes long in the whole apparatus, and the production efficiency is low.

That is, according to the prior art quoted first, the temperature of the intermediate container rises from the surface due to the conduction of heat and arrives at a predetermined temperature requiring a relatively long period of time. Therefore, the facility of a relatively large scale is required for heating the intermediate container, and the production efficiency is low.

It is widely accepted practice to heat the molded articles or the preformed articles of a plastic by using a plurality of linear infrared-ray heaters. In this case, though the individual infrared-ray heaters emit large amounts of radiant energy, the amount of radiant energy on the surface of the material being heated is of a level of smaller than 20% that on the surface of the heat-radiating members since the radiant heat is diffused from the linear heaters and, hence, the heating is accomplished requiring a relatively extended period of time. In the case of heating the preformed article having a large thickness, when the amount of radiant energy is increased on the surface of the material to be heated, the temperature difference increases between the surface and the interior. Usually, therefore, the heating is effected suppressing the amount of the radiant energy.

In an ordinary heating system based on a combination of the linear heaters, a relatively large distance is maintained between the heater and the material to be heated or the distance is finely adjusted among the heaters or between the heaters and the material to be heated, in order to uniformalize the level of radiant energy on the surface of the material to be heated. Therefore, laborious work is required for the adjustment to uniformly heat the material having relatively large surfaces to be heated, and the amount of radiant energy becomes relatively small on the surface of the material to be heated.

During the heating by the infrared rays, furthermore, the temperature of the material to be heated is also raised by the heat of convection in addition to radiant rays. The temperature rise by the convection is supported by the conduction of heat from the surface of the material to be heated, which works to increase the temperature difference in the direction of thickness of the material to be heated. In general, the temperature of the radiation member and the atmospheric temperature near the radiation body are very higher than the temperature of the material that is being heated. When the material to be heated is brought close to the linear heater, therefore, the effect of the heat of convection is added up to the distribution of radiant energy, and the temperature varies to a great extent in the material that is being heated. When the material to be heated is separated away from the linear heaters, on the other hand, the intensity of the radiant energy decreases on the surface of the material to be heated, whereby an extended period of time is required for the heating. When the heating is effected using an extended period of time, the temperature difference due to the heat of convection increases in the direction of thickness of the material to be heated.

SUMMARY OF THE INVENTION

The object of the present invention therefore is to provide a method of heating the secondary molded particle obtained by blow-molding a preformed article up to a predetermined temperature by the infrared-ray heating within very short periods of time to thermally crystallize it.

According to the present invention, there is provided a process for producing biaxially drawn plastic bottles having excellent heat resistance by blow-molding a preformed article that is heated at a drawing temperature, comprising:

A. a step of biaxially drawing and free blow-molding the preformed article to obtain a secondary molded article thereof;

B. a step of heating and shrinking the secondary molded article by inserting it for a short period of time in the infrared rays emitted from an infrared-ray radiation member that has a substantially planar radiation surface having a height larger than that of the secondary molded article in the direction of height and having a surface temperature of from 350° C. to 1000° C. and, preferably, from 500° to 900° C., in order to obtain a tertiary product thereof; and C. a step for blow-molding the tertiary product that is in a heated state in a metal mold to obtain a final molded article.

According to the present invention, it is desired that the secondary molded article is heated at a temperature of from 140° to 220° C. such that the barrel portion and the bottom portion (excluding the gate portion) have a crystallinity of not smaller than 36% in a state where the amount of radiant energy of infrared rays emitted from the infrared-ray radiation member is from 1.0 to 20 W/cm$^2$ and, preferably, from 1.5 to 15 W/cm$^2$ on the surface of the secondary molded article.

In biaxially drawing and free blow-molding the preformed article in the step A, furthermore, it is desired to hold the mouth of the preformed article heated at a drawing temperature using a mouth-holding fitting, to put a drawing rod into the preformed article and to introduce the pressurized fluid into the preformed article, or to maintain a state in which the center of the bottom of the preformed article is sandwiched by the drawing rod put into the preformed article and a pushing rod on the outside of the preformed article, and to introduce the pressurized fluid therein while driving the drawing rod onto the bottom.

According to the present invention, furthermore, there is provided an apparatus for producing biaxially drawn plastic bottles having excellent heat resistance comprising:

a. means for heating a preformed article;
b. means for biaxially drawing and free blow-molding said preformed article without using a metal mold to obtain a secondary molded article;
c. a fixed infrared-ray radiation member having a substantially planar radiation surface for heating the secondary molded article at a high speed;
d. means for facing said secondary molded article to said infrared-ray radiation member substantially uniformly in the circumferential direction to obtain a tertiary molded article which is in a heated state having a predetermined crystallinity; and
e. means for secondarily blow-molding said tertiary molded article in a metal mold to obtain a final molded article.

In the apparatus of the present invention, when the planar infrared-ray radiation member has a cylindrical radiation surface, the secondary molded article is inserted in the cylinder and is heated uniformly. When the planar infrared-ray radiation member does not have a cylindrical shape, the secondary molded article is faced in a revolving manner substantially uniformly in the circumferential direction and is heated.

BRIEF DESCRIPTION OF THE DRAWINGS

FIG. 6 is a side view of a step (A) for free blow-molding in the apparatus according to Example 2 of the present invention;

DETAILED DESCRIPTION OF THE INVENTION

Figure 1:
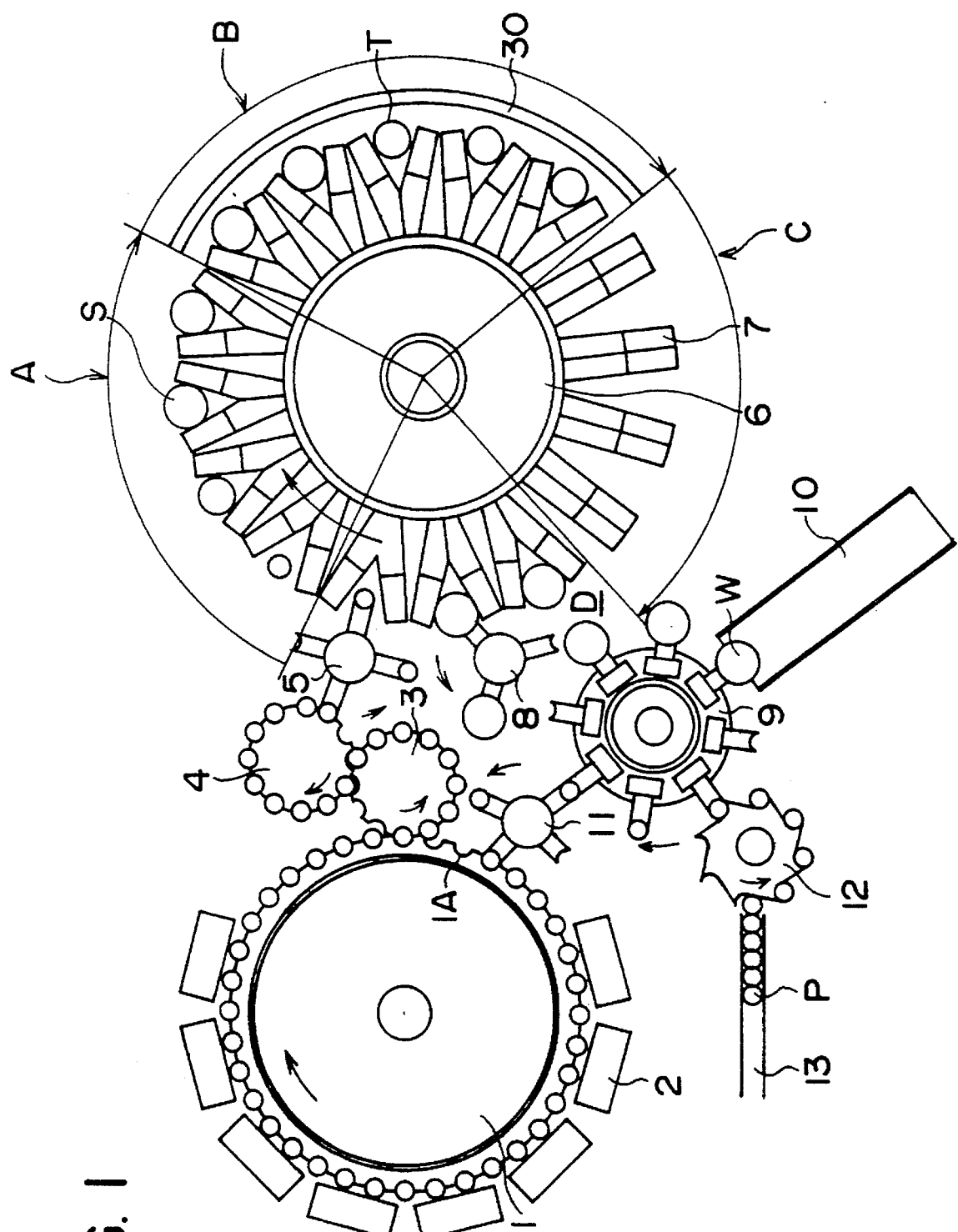
FIG. 1 is a diagram illustrating the whole arrangement of an apparatus according to Example 1 of the present invention.

According to the present invention, a secondary molded article obtained by blow-molding a preformed article is heated by using a planar infrared-ray radiation member at a temperature of from 140° to 220° C. within a short period of time, so that the plastic is crystallized to a high degree.

The planar infrared-ray radiation member has a large infrared-ray radiation area which is continuous nearly uniformly. It is therefore possible to maintain the amount of infrared-ray radiant energy at a uniform and high level on the surface of the secondary molded article.

The crystallinity which serves as a rough indication of heat resistance of the bottle is an average value in the direction of thickness of the bottle, and is determined by the heating temperature and the heating time. In the case of short-period heating, a correlation has been obtained between the heating temperature and the crystallinity. In a region of heating temperature of up to 220° C., the heating temperature can be estimated by measuring the crystallinity of the product. The crystallinity required for imparting heat resistance to the bottle is desirably 36% or larger. A desired crystallinity is not obtained when the heating temperature is lower than 140° C. When the heating temperature is higher than 220° C., the rate of crystallization decreases or the plastic melts making it difficult to obtain a desired crystallinity within short periods of time.

Compared to the heating by the conduction of heat from the surface using the hot air, the infrared-rays in the case of the infrared-ray heating penetrate into the plastic so that it is heated relatively efficiently. During the heating by using infrared rays, there develops such a temperature distribution that the side irradiated with the infrared rays becomes high and the opposite side becomes low in the direction of thickness of the plastic. The temperature distribution and the amount of temperature rise are affected by the infrared-ray transmission/absorption factors of the plastic, thickness of the plastic, amount of radiant energy of the irradiated infrared rays, distribution of wavelengths of infrared rays, conduction of heat in the direction of thickness of the plastic and the heating time. In this case, the conduction of heat in the direction of thickness of the plastic works to decrease the temperature difference in the direction of thickness.

According to the present invention, the secondary molded article can be heated at a temperature within a predetermined range in the direction of the thickness thereof within short periods of time by the infrared-ray heating system in which the above-mentioned conditions are suitably set.

According to the present invention, a preformed article is free blow-molded i.e., blow-molded without using a metal mold to obtain a secondary molded article. Here, the thickness of the barrel portion and the thickness of the the bottom portion of the secondary molded article to be heated are selected to be substantially smaller than 0.5 mm and, preferably, from 0.2 mm to 0.45 mm, such that it can be heated within a short period of time (excluding the thickness of a portion in the bottom for introducing resin for injection-molding and the vicinity thereof (hereinafter simply referred to as gate portion)). When the thickness of the portion to be heated exceeds 0.5 mm, the temperature distribution becomes too great in the direction of thickness in the case of short-time heating and it becomes difficult to confine the temperatures within a desired range.

The free blow-molding gives such an advantage that a secondary molded article is obtained having a relatively uniform thickness as compared with the conventional molding using a metal mold.

In the molding using a metal mold at room temperature, the temperature of the secondary molded article drops down nearly to room temperature. On the other hand, the secondary molded article obtained by free blow-molding the preformed article heated at 85° to 115° C. according to the present invention, is in a state in which the temperature is further increased by about 20° C. by the heat generated as a result of drawing. Therefore, the free blow-molding makes it possible to decrease the width of temperature that must be raised by the infrared-ray heating, contributing to shortening the time for heating.

Moreover, the step of infrared-ray heating can be started during the free blow-molding, making it possible to enhance the production efficiency compared with when the infrared-ray heating is carried out after the primary blow-molding has been finished.

The secondary molded article undergoes the thermal shrinking during the rise in temperature and after the temperature is raised and turns into a tertiary molded article. By controlling the internal pressure of the molded article, furthermore, the amount of thermal shrinkage is controlled and the article is maintained in a state in which the outer diameter and the height are slightly smaller than those of the metal mold in a stage of the tertiary molded article that is inserted in the metal mold for being secondarily blow-molded.

The tertiary molded article after heated with infrared rays is cooled to some extent until it enters into the step of secondary blow-molding, and the temperature difference between the inner surface and the outer surface is leveled by the conduction of heat in the direction of thickness. Usually, a leveling time of from about 0.3 to about 3 seconds is provided.

The infrared-ray radiation member of the present invention is has a height larger than that of the secondary molded article in the direction of height, has substantially a planar radiation surface, and has a radiation surface temperature of from 350° to 1000° C. and, preferably, from 500° to 900° C.

Furthermore, the infrared-ray radiation member is so arranged that the amount of radiant energy of infrared rays radiated from the infrared-ray radiation member is from not smaller than 1.0 W/cm² to 20 W/cm² and, preferably, from 1.5 W/cm² to 15 W/cm² on the surface of the secondary molded article.

The amount of radiant energy of infrared rays E (W/cm²) on the surface of the secondary molded article is found by applying a black body paint having Emittance of about 0.9 on the surface irradiated with the infrared rays, placing a steel foil (a square having a width of 10 mm, a thickness of 75 μm, measurement efficiency of the amount of radiant energy of 70%) provided on the back surface thereof with a thermocouple on a measuring portion, measuring the rate of temperature rise (°C./sec) per a unit time of the thermocouple, an converting the value into the amount (E) of radiant energy.

Described below is the conversion equation (1). To the amount of radiant energy (E) of this case is added the amount of heat energy due to the heat of convection.

$$E=0.043\times\theta \tag{1}$$

When the amount of radiant energy (E) of infrared rays is smaller than 1.0 W/cm² on the surface of the secondary molded article, it becomes difficult to heat the secondary molded article at a predetermined temperature within short periods of time.

When the amount of radiant energy (E) of infrared rays is greater than 20 W/cm² on the surface of the secondary molded article, the temperature difference becomes too great between the outer surface side and the inner surface side of the secondary molded article, and it becomes difficult to maintain the temperatures on the inner and outer surfaces within a predetermined range.

The amount of radiant energy (E) of infrared rays on the secondary molded article varies depending upon the temperature of the radiation member, radiation factor, area of radiation, shape of radiation surface, and distance from the radiation surface.

When the temperature on the radiation surface of the radiation member becomes lower than 350° C., it becomes difficult to maintain a predetermined amount of radiant energy (E) of infrared rays on the surface of the secondary molded article.

When the temperature on the radiation surface of the radiation member exceeds 1000° C. the radiation member having a relatively wide area that is continuous, on the other hand, the amount of radiant energy (E) becomes too great on the secondary molded article, which is not desirable.

During the heating by using infrared rays, the temperature of the secondary molded article is raised by the heat of convection in addition to the radiant rays. The heat of convection works to increase the temperature difference between the inner surface and the outer surface of the secondary molded article. The temperature of the radiation member and the temperature of atmosphere near the radiation member are very higher than the temperature at which the molded article is heated. Therefore, the temperature difference between the inner surface and the outer surface becomes a problem when the time in which the secondary molded article faces the heat radiation member is lengthened. However, the heating for a short period of time of the present invention makes it possible to confine the temperature difference between the inner surface and the outer surface of the secondary molded product to lie within a desirable range.

According to the present invention, it is particularly preferred to effect the free blow-molding in the step A by sandwiching the bottom of the preformed article by using a drawing rod inserted in the preformed article and a pushing rod placed at the center on the bottom on the outside of the preformed article while driving the drawing rod toward the direction of the bottom while locking the center of the bottom. This makes it possible to prevent the center of the bottom from deviating out of the axis of the preformed article and to obtain a relatively stable shape without permitting the neck portion to be bent.

According to the present invention, the drawing rod is raised in synchronism with the blow-molding by drive means having a drive source such as a pneumatic pressure means or an electric motor while the pushing rod is raised depending upon the rise of the drawing rod maintaining the downwardly pressurized state utilizing pneumatic pressure or the like, and the article is inflated while controlling the center of the bottom using the drawing rod and the pushing rod. In the final stage or toward the final stage of free blow-molding, the driving speed of the drawing rod is set to be slightly lower than the rate of inflation in the axial direction of the preformed article, so that the degree of inflation differs depending upon the center of the bottom sandwiched by the drawing rod and the pushing rod and the bottom portion other than the above central portion. This makes it possible to obtain a secondary molded article having bottom of a shape in which the central portion of the bottom is recessed toward the inside which is close to the shape of bottom of the final molded article.

Thus, the secondary molded article is obtained in a shape which is close to that of the final molded article (particularly, in regard to the shape of the bottom), so that the processing needs be executed to a small degree in the secondary blow-molding. Therefore, the thickness of the final molded article does not become locally small to lose the strength or crystallinity; i.e., the strength near the bottom of the final molded article can be increased without permitting the thickness to become locally small. Thus, there is obtained the final molded article having a relatively uniform thickness and a reduced weight.

EXAMPLES

The present invention will now be described by way of Examples.

[Example 1]

Referring to FIGS. 1 to 4 illustrating an embodiment of the apparatus of the present invention, the apparatus roughly comprises means 1 and 2 for heating preformed articles P, a free blow-molding step zone A (FIG. 2) for obtaining secondary molded articles S by biaxially drawing and blow-molding the preformed articles P without using metal molds, a fixed infrared-ray radiation member 30 having a substantially planar radiation surface for heating the secondary molded articles S at high speeds, a heating step zone B (FIG. 3) for obtaining tertiary molded articles T having a desired crystallinity and in a heated state by rotating the secondary molded articles S so as to be faced to the infrared-ray radiation member 30 substantially uniformly in the circumferential direction, and a secondary blow-molding step zone C (FIG. 4) for finally molding the tertiary molded articles T in the metal molds 7.

In FIG. 1 illustrating the whole arrangement of the apparatus of this Example, reference numeral 1 denotes a heating wheel for heating the preformed articles P. Along the periphery of the heating wheel are arranged maintaining an equal distance the holding portions 1A which accept mandrels 14 supporting the preformed articles and rotatably hold them. The preformed articles P revolves accompanying the rotation of the heating wheel 1 and are heated by the heaters 2 arranged encircling them.

In FIG. 1, reference numerals 3 and 4 denote heat-equalizing wheels for thermally equalizing the inner and outer surfaces of the preformed articles, and along the circumferences thereof are arranged maintaining an equal distance the holding portions 1B like those of the heating wheel.

Reference numeral 5 denotes a carrier wheel that makes a relay between the heat-equalizing wheel 4 and the blow-molding metal mold 7 of a blow wheel 6, and reference numerals 8 and 11 denote carrier wheels that make a relay between the blow-molding metal mold 7 of the blow wheel and a feed/discharge wheel 9 and a relay between the feed/discharge wheel 9 and the heating wheel 1.

In the heating step zone B along the outer circumference of the blow wheel 6, an infrared-ray radiation member 30 is disposed at a position being faced to the blow-molding metal mold 7.

On the blow wheel 6 are arranged a bottle discharge/preformed article feed zone D, a free blow zone A, an intermediate heating zone B and a final molding zone C in the order mentioned. It will be understood from FIG. 1, that the blow-molding metal mold 7 is open in the bottle discharge/preformed article feed zone D, in the free blow zone A and in the intermediate heating zone B, but is closed in the final molding zone C.

Figure 3:
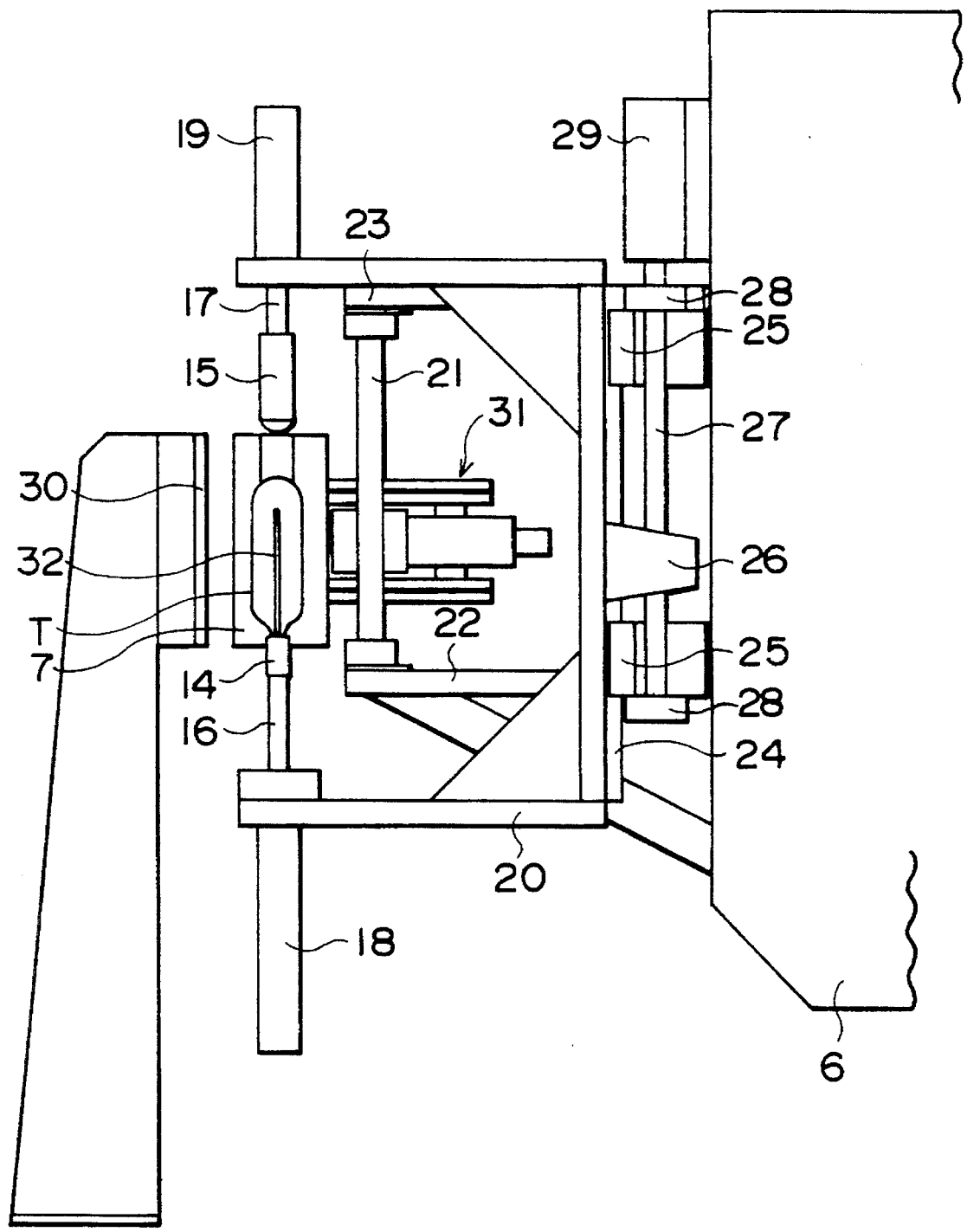
FIG. 3 is a side view of a step (B) for heating in the apparatus according to Example 1 of the present invention.

Referring to FIG. 3, along the circumference of the blow wheel 6 are arranged a number of blow-molding metal molds 7 by means of support arms 22, 23 and a support rod 21. Each blow-molding metal mold 7 consists of a split mold and is provided with a device 31 for opening and closing the metal mold. Though not diagramed, the metal mold opening/closing device 31 is opened and closed by using a pressurized cylinder or the like, and the opening/closing operation is controlled by using a cam mechanism or a limit switch provided for the blow wheel.

In order to support the preformed article, intermediate article or the finally molded article in the blow wheel 6, each metal mold is provided with a mandrel support rod 16 that rotates together with the blow wheel 6 and is further provided with a drawing rod 32 for drawing the preformed article or the intermediate molded article in the axial direction (vertical direction). The drawing rod 32 enters into, or comes out of, the preformed article or the molded article through the mandrel.

An air cylinder 18 for driving the mandrel support rod 16 and drawing rod 32, bottom-molding metal mold 15, a support rod 17 therefor, and an air cylinder 19 for driving the support rod 17, are provided in concentric on a support frame 20 which is coupled, via a guide rail 24 and a linear bearing 25, to the blow wheel 6 so as to move in the vertical direction.

A ball-screw bearing 26 is secured to the support frame 20, the ball-screw bearing 26 in mesh with a ball-screw 27 that is supported by bearings 28 secured to the blow wheel 6. The support frame 20 moves up and down by driving the ball-screw 27 using a servo motor 29.

At the end of the mandrel support rod 16 is provided a holding portion (not shown) that accepts the mandrel 14 and rotatably holds it.

In FIG. 1, furthermore, reference numeral 10 denotes a converter for discharging the molded articles W, and 12 denotes a star wheel which receives the preformed articles P from a chute 13 and feeds them to the feed/discharge wheel 9.

The thus constituted production apparatus operates as described below.

<Preparatory Step> (FIG. 1)

A preformed article P obtained by the injection molding or the like molding is subjected to the heat treatment for reinforcing the heat resistance at the neck portion thereof, and is then fed from the chute 13, via the star wheel 12, to the mandrel 14 held by the feed/discharge wheel 9.

The preformed article supported by the mandrel is fed together with the mandrel from the feed/discharge wheel 9 to the holding portion of the heating wheel 1 via the carrier wheel 11, and is heated by the heater 2 while revolving accompanying the rotation of the heating wheel.

The heater 2 is so controlled that the temperatures on the inner and outer surfaces of the heated preformed article are equalized while passing through the heat-equalizing wheels 3 and 4 and that the temperatures are about from 85° to 115° C. near the outlet of the heat-equalizing wheel 4. The equally heated preformed article is sent together with the mandrel to the blow wheel 6 by the carrier wheel 5, and is held by the holding portion of the mandrel support rod 16. The preformed article is then transferred to the next step.

Figure 2:
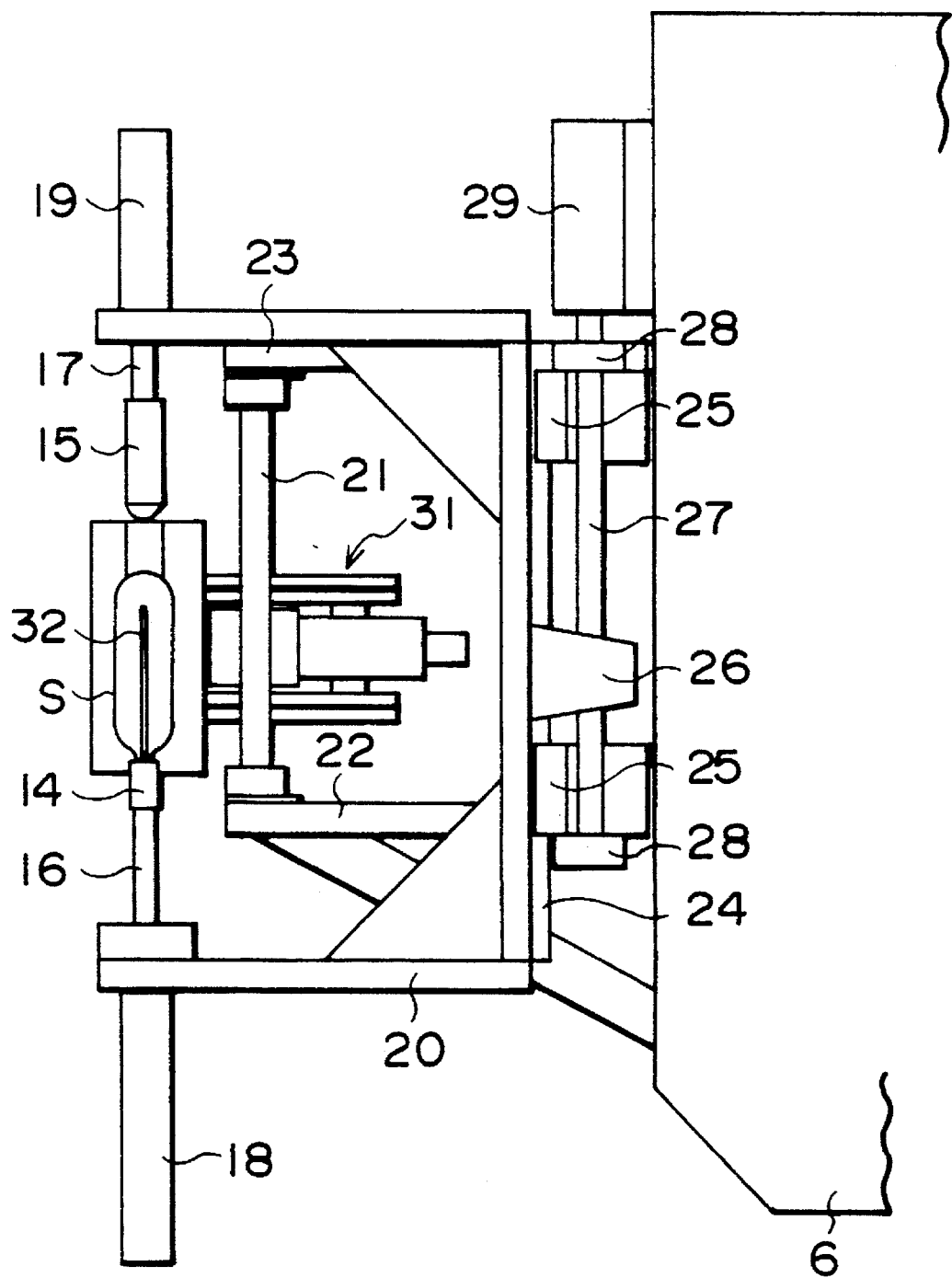
FIG. 2 is a side view of a step (A) for free blow-molding in the apparatus according to Example 1 of the present invention.

<Primary Blow-Molding Step: A> (FIG. 2)

The preformed article is fed to the blow-molding metal mold 7. The primary blow-molding (called free blow-molding without using metal mold) is carried out by introducing the compressed air while causing the drawing rod 32 to act onto the preformed article with the blow-molding metal mold 7 opened. In this case, the size of the secondary molded article is such that the height is from 1 to 1.2 times as great as that of the finally molded article W, the outer diameter is from 1 to 1.3 times as great, and the blowing pressure is from 3 to 7 kg/cm². The recondary molded article has no contact with the metal mold.

<Heating Step: B> (FIG. 3)

The secondary molded article is faced to the infrared-ray radiation member 30 while revolving the mandrel 14 that is holding the secondary molded article, to effect the heat treatment for about 0.3 to 10 seconds. When the surface temperature becomes from 140° to 220° C. and both the height and outer diameter become smaller than one time of the finally molded article W (this is called a tertiary molded article), the next secondary blow molding is carried out.

The infrared-ray radiation member 30 has an arcuate shape along the outer edge of the blow wheel, radiates the heat from the whole surface thereof, and has a surface temperature of from 350° to 1000° C.

Figure 4:
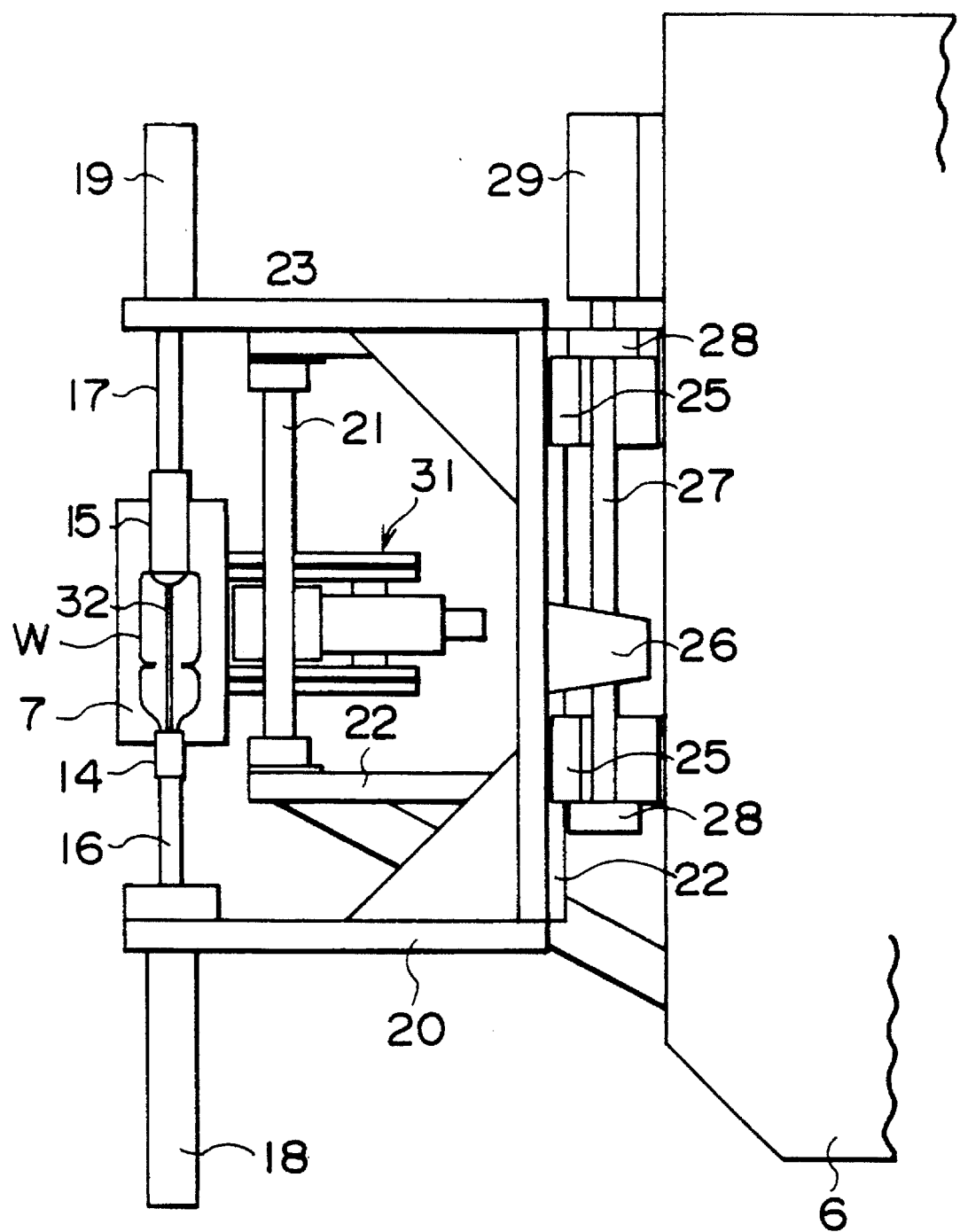
FIG. 4 is a side view of a step (C) for final blow-molding in the apparatus according to Example 1 of the present invention.

<Secondary Blow-Molding Step: C> (FIG. 4)

Revolution of the mandrel 14 is stopped and the ordinary biaxial draw-molding is effected by closing the blow-molding metal mold 7 in order to obtain the final molded article W. The blow-molding metal mold 7 has the shape of the final molded article W, has the temperature of about 70° to 130° C. and the final blow pressure of 40 kg/cm².

<After Step> (FIG. 1)

The finally molded article W is sent by the carrier wheel 8 to the feed/discharge wheel 9 together with the mandrel, separated from the mandrel 14 by the feed/discharge wheel, and is discharged onto the discharge conveyer 10.

In the above-mentioned apparatus, the preformed article P, intermediate molded article S and final molded article W are all held by the mandrel 14 which has at its upper portion an engaging portion that comes into air-tight engagement with a neck portion of the preformed article P and has at its lower portion a plug of a simple joint for a pressurized fluid. The engaging portion comprises a gasket for sealing the mouth at the end of the preformed article, a split mold having ends that engage with the support ring of the preformed article, and a slide ring for liberating the engagement between the ends of the split mold and the support ring. The preformed article P that is pushed onto the mandrel 14 makes it possible to accomplish air-tight coupling between the two. The two are separated away from each other when the slide ring is pushed down and the preformed article is pulled out. A socket of the simple joint for the pressurized fluid is provided at the end of the mandrel support rod 16, so that the two can be easily coupled together or separated away from each other.

Barrel portion and bottom portion of the final molded article W were measured for their crystallinity to be from 36 to 55%. The final molded article W was filled with the hot water of 95° C. to check the heat resistance. The change in the volume was not greater than 2% exhibiting sufficient heat resistance.

[Example 2]

Figure 5:
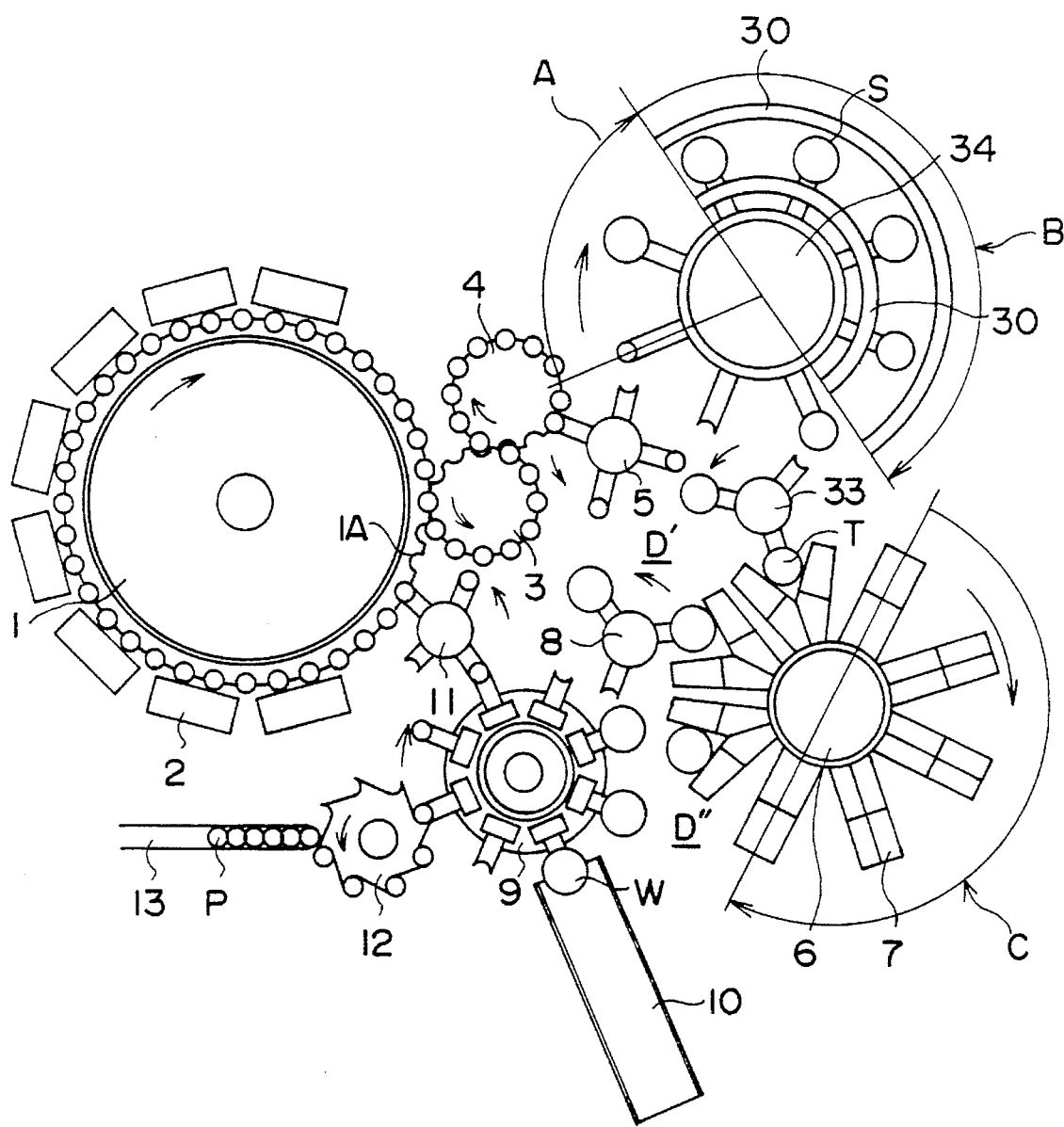
FIG. 5 is a diagram illustrating the whole arrangement of the apparatus according to Example 2 of the present invention.

In Example 1, the three steps were carried out on one blow wheel. In order to enhance the degree of freedom for setting the conditions in each of the steps and to decrease the number of the metal molds, however, the steps are carried out using the two blow wheels; i.e., the free blow-molding step A and the heating step B are carried out using the primary blow wheel 34, and the final blow molding in the metal mold is carried out using the main blow wheel 6 (FIG. 5). The preformed article P is fed to the primary blow wheel 34 and the tertiary molded article is discharged in the zone D'. The metal mold 7 is opened in the discharge zone D" where the tertiary molded article is fed and the final molded article W is discharged, and is closed in the secondary blow-molding step C.

In FIG. 5, reference numeral 1 denotes a heating wheel for heating the preformed articles P. Along the periphery of the heating wheel are arranged maintaining an equal distance the holding portions 1A which accept mandrels 14 supporting the preformed articles and rotatably hold them. The preformed articles revolves accompanying the rotation of the heating wheel 1 and are heated by the heaters 2 arranged encircling them.

In FIG. 5, reference numerals 3 and 4 denote heat-equalizing wheels for thermally equalizing the inner and outer surfaces of the preformed articles, and along the circumferences thereof are arranged maintaining an equal distance the holding portions like those of the heating wheel.

Reference numeral 5 denotes a carrier wheel that makes a relay between the heat-equalizing wheel 4 and a primary blow wheel 34, and 33 denotes a carrier wheel that makes a relay between the primary blow wheel 34 and the blow-molding metal mold 7 of the blow wheel 6. Reference numerals 8 and 11 denote carrier wheels that make a relay between the blow-molding metal mold 7 of the blow wheel 6 and a feed/discharge wheel 9 and a relay between the feed/discharge wheel 9 and the heating wheel 1.

In the outer circumferential portion and in the inner side portion of the primary blow wheel 34 (see FIGS. 5 and 7), there are disposed infrared-ray radiation members 30 facing the secondary molded articles S.

Figure 7:
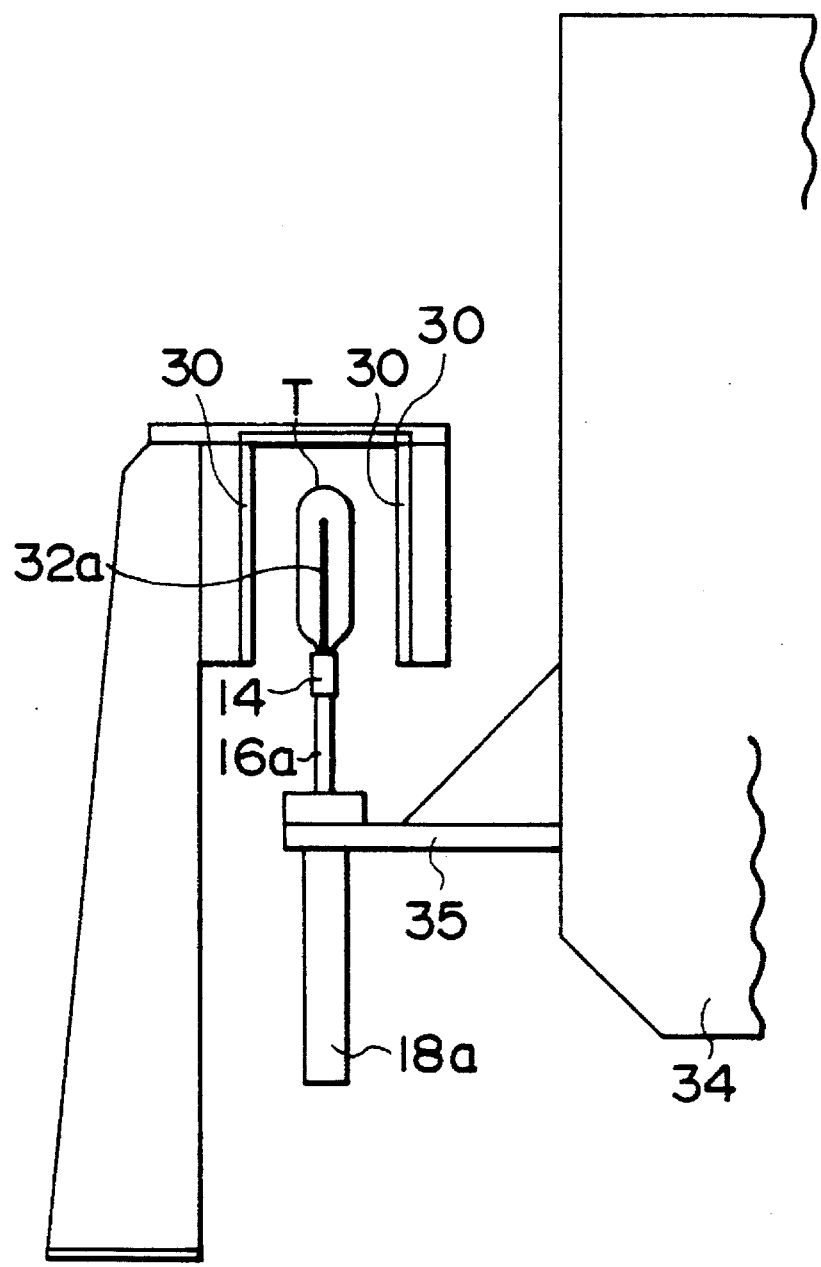
FIG. 7 is a side view of a step (B) for heating in the apparatus according to Example 2 of the present invention.

As shown in FIG. 7, onto the primary blow wheel 34 are secured, by means of a support arm 35, the mandrel support rod 16a and the air cylinder 18a for driving the drawing rod 32a. At the end of the mandrel support rod 16a is provided a holding portion which accepts and rotatably hold the mandrel 14. Their fundamental constitutions are the same as those of Example 1.

Figure 8:
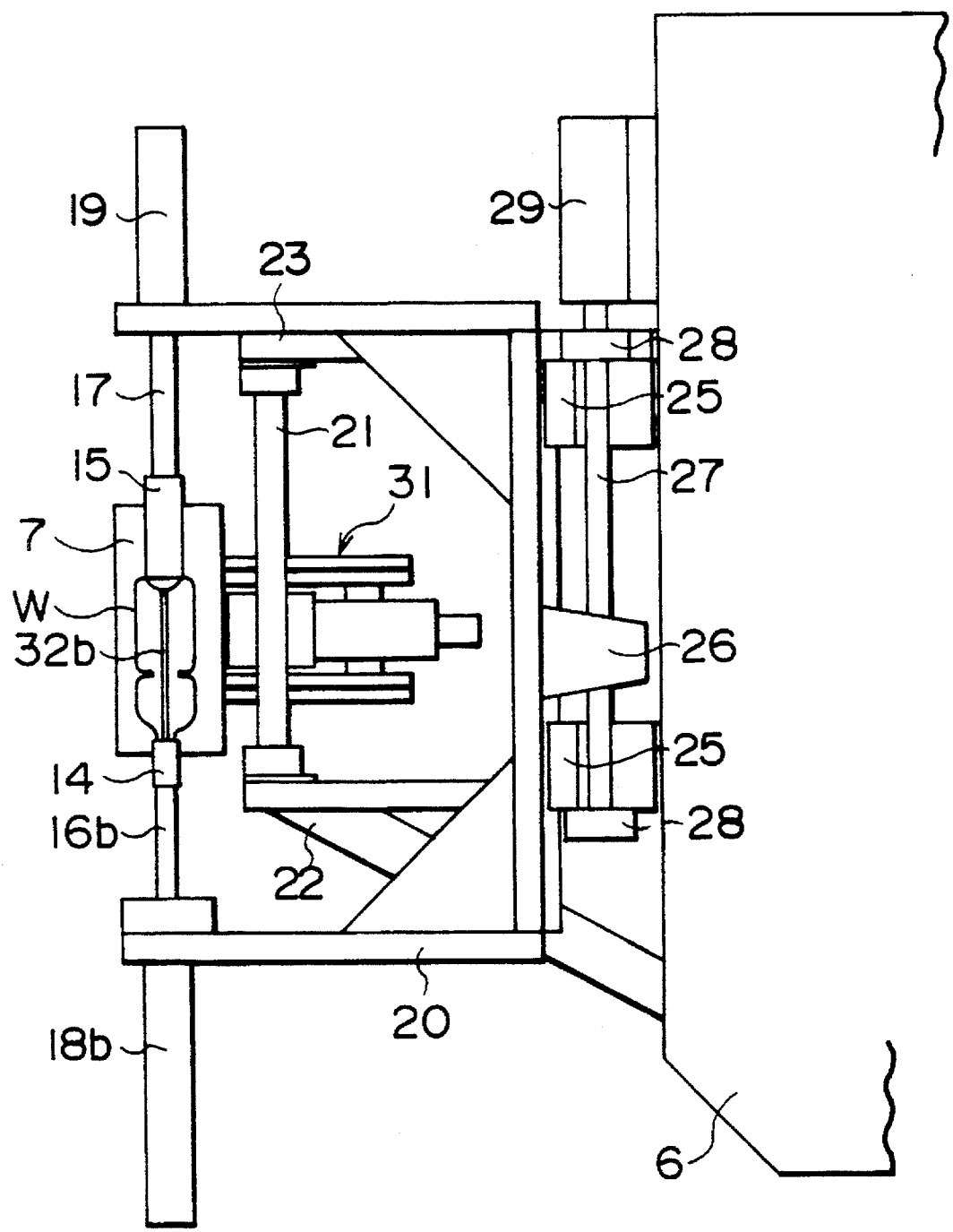
FIG. 8 is a side view of a step (C) for final blow-molding in the apparatus according to Example 2 of the present invention.

Referring to FIG. 8, on the blow wheel 6 are arranged blow-molding metal molds 7 by means of support arms 22, 23 and a support rod 21. An air cylinder 19 for driving the mandrel support rod 16b and drawing rod 32b, a bottom-molding metal mold 15, a support rod 17 therefor, and an air cylinder 19 for driving the support rod 17, are provided in concentric on the support frame 20 which is coupled, via a guide rail 24 and a linear bearing 25, to the blow wheel 6 so as to move in the vertical direction. A ball-screw bearing 26 is secured to the support frame 20 which is then moved by bearings 28 secured to the blow wheel 6, a ball-screw 27 and a servo motor 29. Their fundamental constitutions are the same as those of Example 1.

In FIG. 5, furthermore, reference numeral 10 denotes a conveyer for discharging the molded articles W, and 12 denotes a star wheel which receives the preformed articles P from a chute 13 and feeds them to the feed/discharge wheel 9.

The thus constituted production apparatus operates as described below.

<Preparatory Step> (FIG. 5)

The preformed article evenly heated at about 85° to 115° C. in the same manner as in Example 1 is sent together with the mandrel to the primary blow wheel 34 by the carrier wheel 5, and is held by the holding portion of the mandrel support rod 16a. The primary blow-molding is then carried out as described below.

<Primary Blow-Molding Step: A> (FIG. 6)

The primary blow-molding (called free blow-molding without using metal mold) is carried out by introducing the compressed air while causing the drawing rod 32a to act onto the preformed article. In this case, the size of the secondary molded article is such that the height is from 1 to 1.2 times as great as that of the finally molded article W, the outer diameter is from 1 to 1.3 times as great, and the blowing pressure is from 3 to 7 kg/cm².

<Heating Step: B> (FIG. 7)

The secondary molded article is faced to the infrared-ray radiation member 30 while revolving the mandrel 14 that is holding the secondary molded article, to effect the heat treatment for about 0.3 to 10 seconds. When the surface temperature becomes from 140° to 220° C. and both the height and outer diameter become smaller than one time of the finally molded article W (this is called a tertiary molded article), the molded article is fed by the carrier wheel 33 to the blow-molding metal mold 7 of the blow wheel 6.

The infrared-ray radiation member is constituted by a pair of an arcuate surface 30 concentric with the primary blow wheel and a flat surface 30 facing the bottom of the secondary molded article S, and emits the infrared rays from substantially the whole surface thereof and has a surface temperature of from 350° to 1000° C. and, preferably, from 450° to 1000° C. In order to obtain a desired amount of radiant energy on the surface of the secondary molded article S that is to be heated, the tunnel-like infrared-ray radiation member should have a length which is sufficiently larger than the outer diameter d of the secondary molded article S. Usually, the length is more than four times as great and is, preferably, more than five times as great as the outer diameter d of the secondary molded article S. In order to increase the amount of radiant energy on the surface of the secondary molded article S, furthermore, the distance should be as small as possible between the infrared-ray radiation member 30 and the secondary molded article S. By taking the uniformity of heating and the effect by the conduction of heat due to convection, however, the distance L from the center of the secondary molded article S having the outer diameter d to the arcuate infrared-ray radiation member 30 should satisfy the following equation, $$0.6d \leq L \leq 4d,$$

and more preferably, $$0.8d \leq L \leq 3d.$$

<Secondary Blow-Molding Step: C> (FIG. 8)

The ordinary biaxial draw-molding is effected by closing the blow-molding metal mold 7 in order to obtain the final molded article W. The blow-molding metal mold 7 has the shape of the final molded article W, has the temperature of about 70° to 130° C. and the final blowing pressure of 40 kg/cm².

<After Step> (FIG. 5)

The finally molded article W is sent by the carrier wheel 8 to the feed/discharge wheel 9 together with the mandrel, separated from the mandrel 14 by the feed/discharge wheel, and is discharged onto the delivery conveyer 10.

Barrel portion and bottom portion of the final molded article W were measured for their crystallinity to be from 36 to 55%. The final molded article W was filled with the hot water of 95° C. to check the heat resistance. The change in the volume was not greater than 2% exhibiting sufficiently large heat resistance.

[Example 3]

As shown in FIGS. 9 to 12, the infrared-ray radiation member 30 is formed in a cylindrical shape, disposed to be corresponded to each of the mandrel support rod, and is permitted to rotate together with the primary blow wheel 34. The apparatus is constituted in the same manner as in Example 2 but without permitting the holding portion for revolving the mandrel provided at the end of the mandrel support rod 16a to rotate and providing the primary blow wheel 34 with a drive mechanism for moving the molded article into the infrared-ray radiation member 30.

The thus constituted production apparatus operates as described below.

Figure 9:
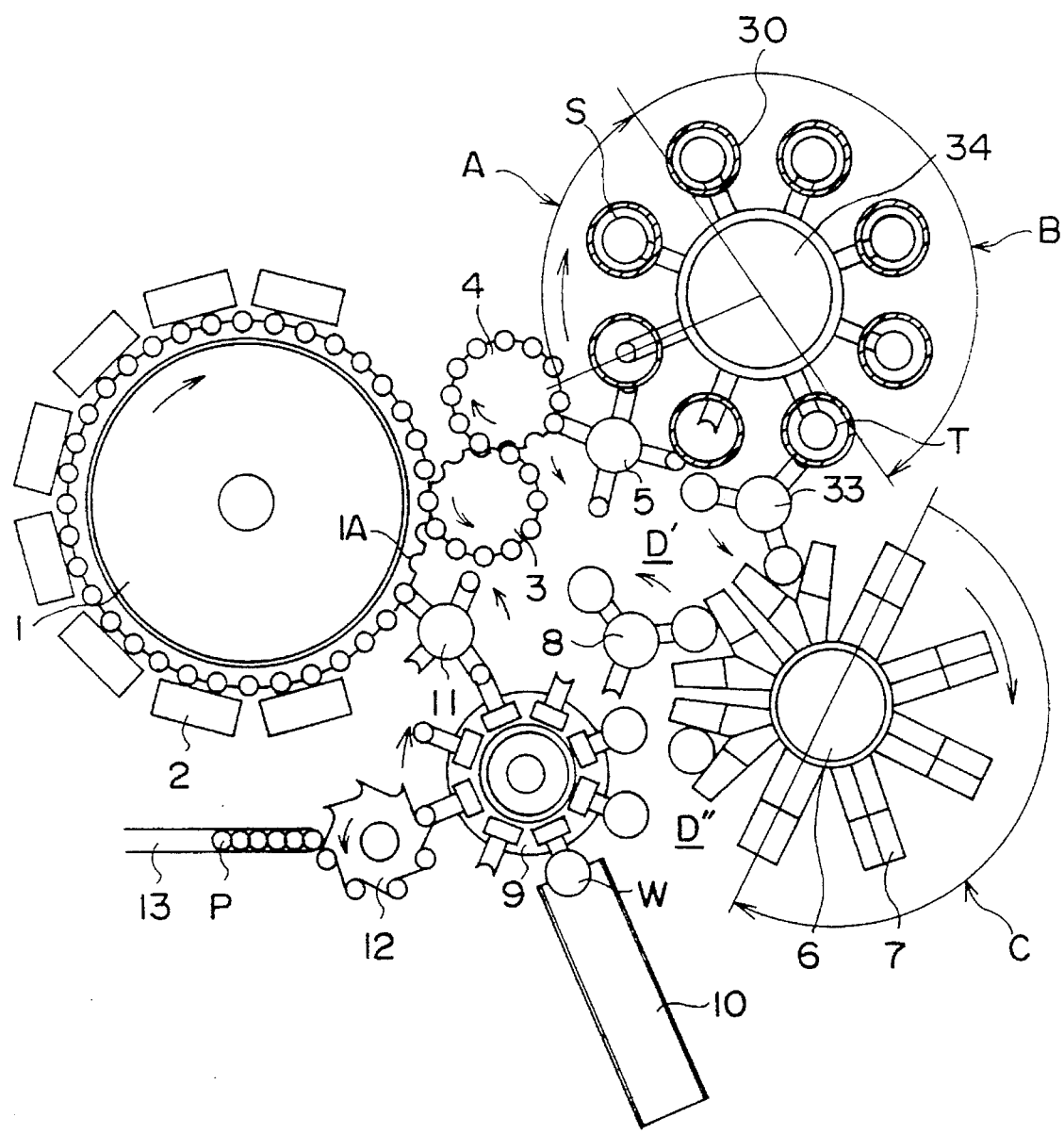
FIG. 9 is a diagram illustrating the whole arrangement of the apparatus according to Example 3 of the present invention.

<Preparatory Step> (FIG. 9)

The preformed article evenly heated at about 85° to 115° C. in the same manner as in Example 1 is sent together with the mandrel to the primary blow wheel 34 by the carrier wheel 5, and is held by the mandrel support rod 16a. The primary blow-molding is then carried out.

Figure 10:
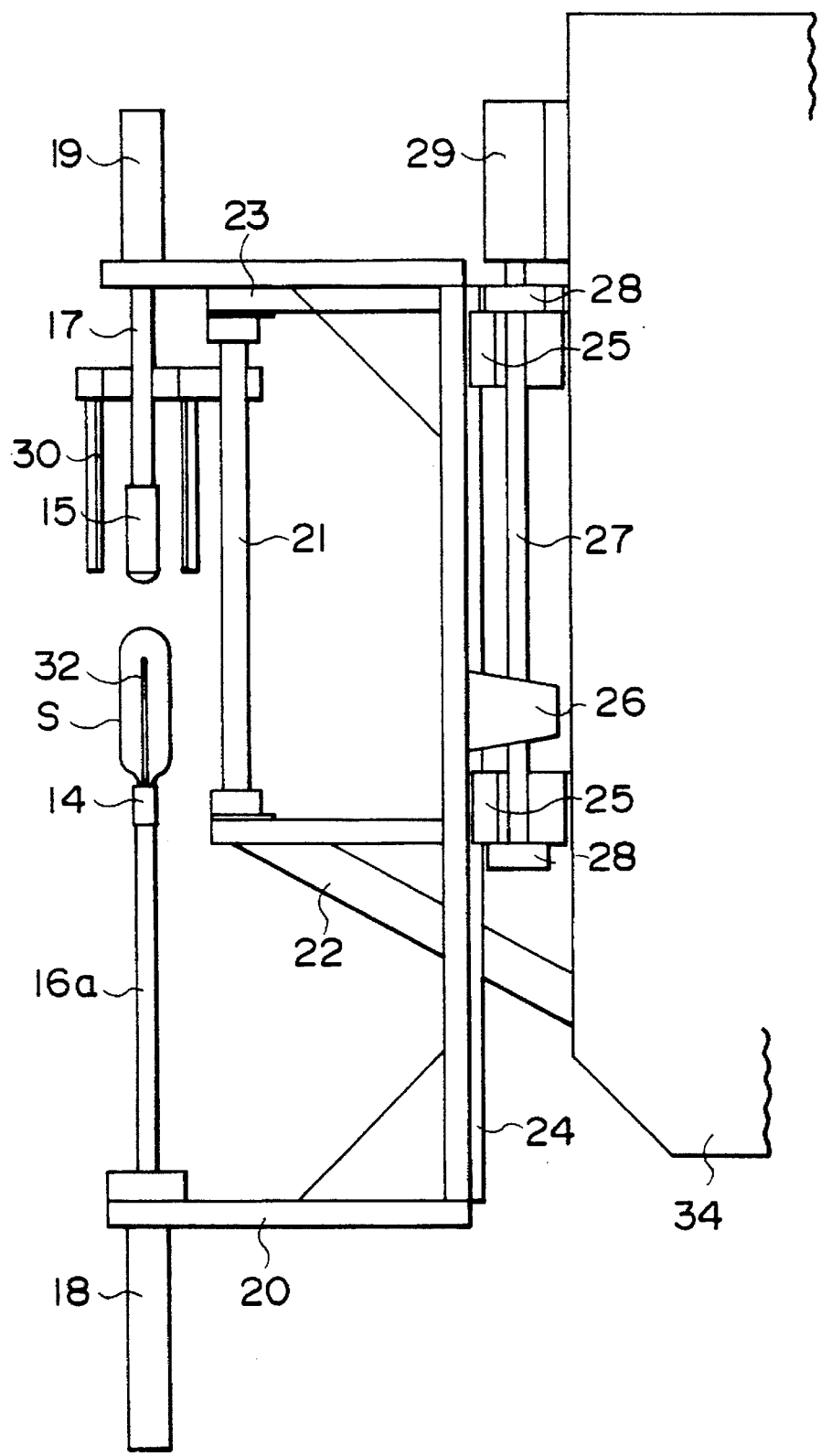
FIG. 10 is a side view of a step (A) for free blow-molding in the apparatus according to Example 3 of the present invention.

<Primary Blow-Molding Step: A> (FIG. 10)

The primary blow-molding (called free blow-molding without using metal mold) is carried out by introducing the compressed air while causing the drawing rod 32a to act onto the preformed article. In this case, the size of the secondary molded article is such that the height is from 1 to 1.2 times as great as that of the finally molded article W, the outer diameter is from 1 to 1.3 times as great, and the blowing pressure is from 3 to 7 kg/cm².

Figure 11:
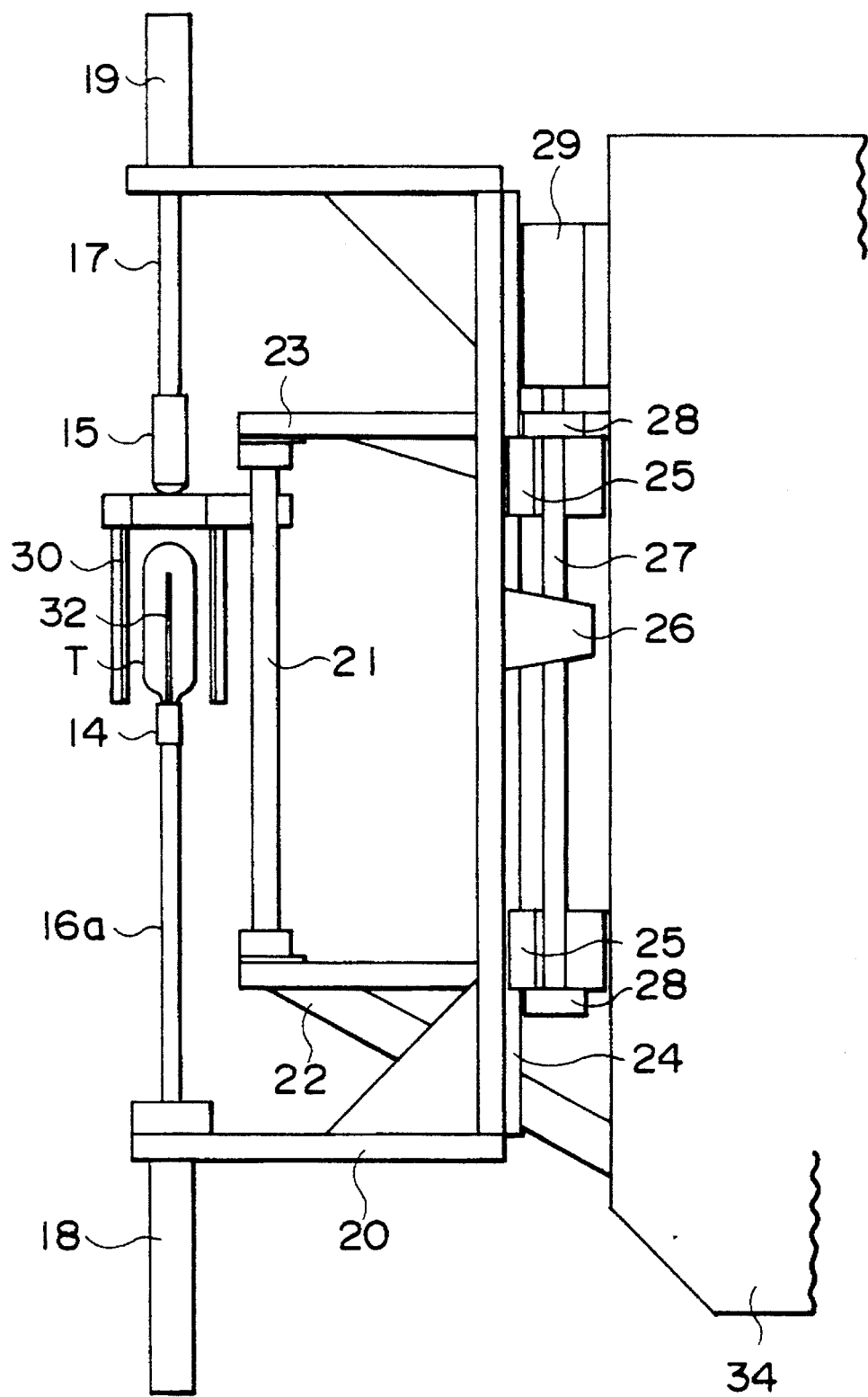
FIG. 11 is a side view of a step (B) for heating in the apparatus according to Example 3 of the present invention.

<Heating Step: B> (FIG. 11)

The secondary molded article is moved into the infrared-ray radiation member 30 to effect the heat treatment for about 0.3 to 10 seconds. When the surface temperature becomes from 140° to 220° C. and both the height and outer diameter become smaller than one time of the finally molded article W (this is called a tertiary molded article), the molded article is fed by the conveyer wheel 33 to the blow-molding metal mold 7 of the blow wheel 6.

The infrared-ray radiation member 30 has a cylindrical shape, an inner diameter which is about twice as great as the outer diameter of the final molded article W, and has a surface temperature of from 350° to 1000° C.

Figure 12:
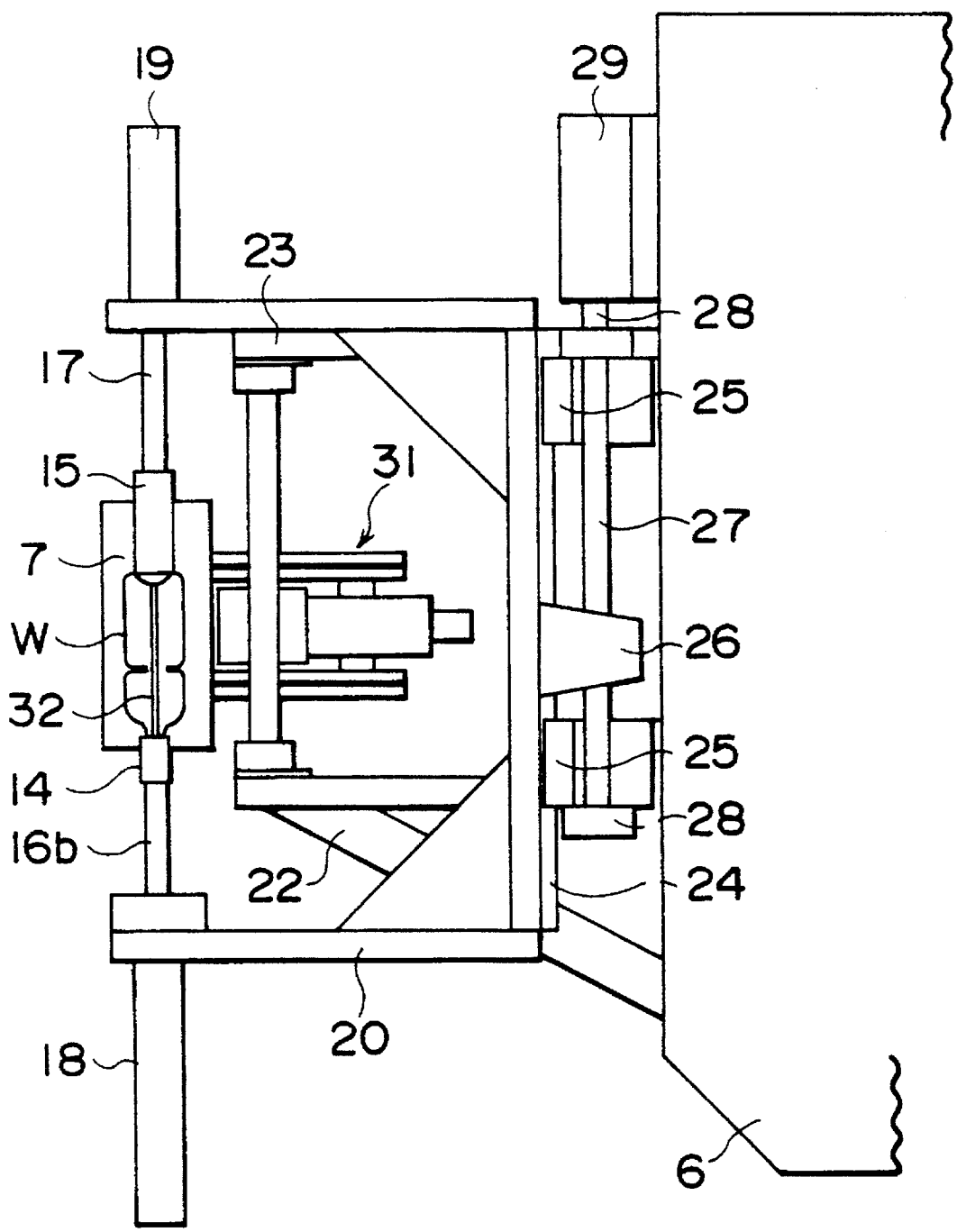
FIG. 12 is a side view of a step (C) for final blow-molding in the apparatus according to Example 3 of the present invention.

<Secondary Blow-Molding Step: C> (FIG. 12)

The ordinary biaxial draw-molding is effected by closing the blow-molding metal mold 7 in order to obtain the final molded article W. The blow-molding metal mold 7 has the shape of the final molded article W, has the temperature of about 70° to 130° C. and the final blowing pressure of 40 kg/cm$^2$.

<After Step> (FIG. 9)

The finally molded article W is sent by the carrier wheel 8 to the feed/discharge wheel 9 together with the mandrel, separated from the mandrel 14 by the feed/discharge wheel, and is discharged onto the delivery conveyer 10.

Barrel portion and bottom portion of the final molded article W were measured for their crystallinity to be from 36 to 55%. The final molded article W was filled with the hot water of 95° C. to check the heat resistance. The change in the volume was not greater than 2% exhibiting sufficiently large heat resistance like in Example 1.

[Production Example 1]

Using the apparatus of Example 3, a polyethylene terephthalate (PET) bottle was prepared as a final molded product having an outer diameter of 94, an overall height of 305 mm (height of the heating portion of about 280 mm) and a capacity of 1500 ml.

A predetermined preformed article was heated at 100° C., free blow-molded to obtain a secondary molded article which was then inserted in the center of the radiation heating member having a cylindrical surface to heat it, thereby to obtain a tertiary molded article. The tertiary molded article was then subjected to the secondary blow-molding in a metal mold to obtain a final molded article.

The radiation heating member having the cylindrical surface possessed an inner diameter of 184 mm and a height of 320 mm, the surface thereof being composed of a melt-injected composite layer of zirconia and titanium oxide (Emittance of about 0.9).

The secondary molded article was heated by changing the surface temperature of the radiation member over a range of from 280° to 900° C. In this case, the heating time was so selected that the temperature on the outer surface was not higher than 220° C. after the secondary molded article was heated. The crystallinity of the obtained tertiary molded article was measured and an average heating temperature was estimated from the crystallinity.

Then, the final molded article was filled with the hot water of 95° C. to evaluate the heat resistance relying upon a change in the volume (a change in the volume of not larger than 2% is acceptable). The results were as shown in Table 1.

TABLE 1

| Radiation heating member | | | Amount of radiant energy | Molded bottle | | | |
|---|---|---|---|---|---|---|---|
| Surface temp. (°C.) | Amount of radiant energy (W/cm$^2$) | Peak wavelength (μm) | on the secondary molded article surface (W/cm$^2$) | Heating time (sec) | Estimated heated temp. (°C.) | Crystallinity (%) | Heat resistance |
| 280 | 0.48 | 5.06 | 0.69 | 5.0 | 130 | 34 | poor |
| 500 | 1.82 | 3.65 | 2.80 | 3.0 | 190 | 46 | good |
| 710 | 4.76 | 2.95 | 7.17 | 1.4 | 205 | 50 | good |
| 900 | 9.66 | 2.47 | 14.1 | 0.5 | 190 | 46 | good |

[Example 4]

FIG. 13 is a diagram of when a preformed article is to be free blow-molded by sandwiching the center of the bottom of the preformed article using the drawing rod inserted in the preformed article and the pushing rod on the outside of the preformed article in compliance with the production method of the present invention.

Figure 13A:
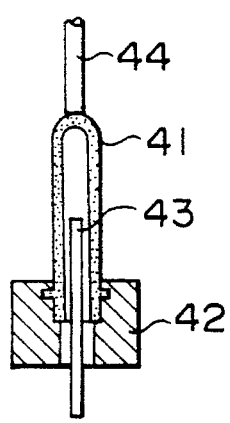
FIG. 13 is a diagram for explaining a step of molding according to the present invention.

In FIG. 13, the preformed article 41 (FIG. 13(A)) obtained by the injection-molding or the like molding is secured at its neck portion by a fixing fitting 42. A drawing rod 43 is inserted in the preformed article 41 from the lower side of the drawing, and its end is in contact with the center of the bottom portion thereof passing along the axis of the preformed article 41. A pushing rod 44 applies a bias to the center of the bottom of the preformed article from the upper side of the drawing, and rises depending upon the rise of the drawing rod 43. The center of the bottom of the preformed article 41 is sandwiched by the drawing rod 43 and the pushing rod 44. The drawing rod 43 moves up and down in synchronism with the blow-molding being driven by a drive means (not shown) having a pneumatic pressure means or an electric motor, and the pushing rod 44 moves up and down by utilizing the pneumatic pressure, a spring or the like.

The preformed article 41 has been heated at a temperature (about 90° to 110° C.) at which it can be drawn.

Figure 13C:
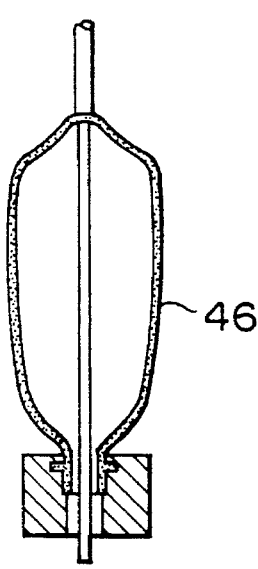
Figure 13D:
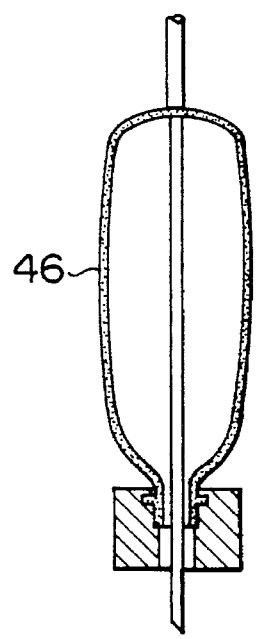
Figure 13B:
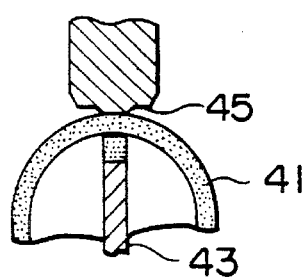

FIG. 13(B) is a diagram illustrating the bottom of the preformed article of FIG. 13(A) on an enlarged scale. In an example shown in FIG. 13, the pushing rod 44 has an end portion of a protruded shape which is heated at a temperature (about 80° to 140° C.) which is higher than the temperature at which the preformed article was molded. On the other hand, the drawing rod 43 has an end composed of a heat-insulating material. The free blow-molding is effected while the pushing rod 44 pushes the central portion of the bottom of the preformed article 41 and the end 45 of the protruded shape thereof bites into the center of the bottom thereof. This makes it possible to reliably prevent the center of the molded article from deviating during the free blow-molding operation. In the thus obtained secondary molded article 46, the central portion of the bottom sandwiched by the drawing rod and the pushing rod remains in an undrawn state, the thickness of which, however, can be reduced by the secondary blow-molding down to the thickness of the surrounding drawn portions.

FIG. 13(C) is a diagram in which a fluid is blown into the preformed article 41 which is in the state of FIG. 13(A), the drawing rod rises and the preformed article is drawn. When the drawing proceeds, the blowing pressure is no longer applied, and the drawing rod and the pushing rod are removed to finish the free blow-molding, there is obtained a secondary molded article 46 having a bottom of nearly a dome-like shape (FIG. 13(D)).

The thus obtained secondary molded article is heated at a temperature higher than the temperature of the secondary blow-molding to obtain a final product. Various heating means can be used in the step of heating such as heating system using the hot air or the heating system by bringing the molded article into contact with the heated solid material. According to the present invention, it is particularly preferred to employ the infrared-ray heating system which is capable of effecting the heating relatively efficiently since infrared rays partly permeate into the interior of the plastic material compared with the heating based on the conduction of heat from the front surface by using the hot air. Furthermore, the desired heating can be accomplished within a relatively short period of time of from about 0.3 to about 10 seconds by passing the secondary molded article which is free blow-molded while revolving it through the tunnel-like heating member made up of a combination of planar infrared-ray heating members.

The temperature at which the secondary molded article starts shrinking varies depending upon the drawing conditions in the free blow-molding, temperature at a moment when the blow pressure is removed from the secondary molded article obtained by the free blow-molding, and the like. Usually, the secondary molded article starts shrinking at about 100° to about 140° C. The molding temperature at which the article can be secondarily blow-molded is usually from 80° to 110° C. or higher, and the secondary molded article is heated at a temperature higher than the shrinking temperature and the drawing temperature.

In the case of the heat resistant container, it is desired that the barrel portion and the bottom portion of the secondary molded article are subjected to a step of heat-set where they are finally heated at 130° to 220° C. so as to be sufficiently crystallized. The tertiary molded article after the step of heat set has been shrunk and crystallized, and has reduced residual stress compared with the secondary molded article.

When a heat resistant container is blow-molded by using an ordinary metal mold, the barrel portion exhibits the required heat resistance when the metal mold temperature is set to be about 80° C. In the case of the free blow-molding without using metal mold, on the other hand, sufficiently large heat resistance is obtained by simply executing the free blow-molding. Therefore, the secondary blow molding needs effect the draw molding for simply adjusting the shape, and the heating step needs maintain the barrel portion at a temperature (about 90° to 140° C.) at which it can be drawn. The bottom portion, on the other hand, is drawn and is blow-molded in a shape of the bottom of the final product which is relatively complex compared with that of the secondary blow-molding. It is therefore desired that the bottom of the secondary molded article is heated to such a degree that it is once shrunk. Through the step of this heat shrinking, the bottom of the final product acquires a desired thickness distribution and exhibits a sufficient degree of strength.

Figure 14A:
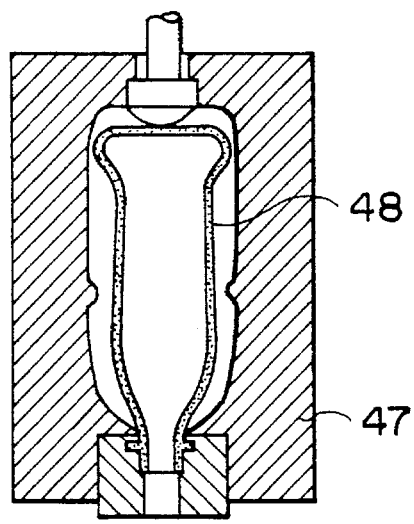
FIG. 14 is a diagram for explaining a step of secondary blow-molding that succeeds the molding step of FIG. 13.
Figure 14B:
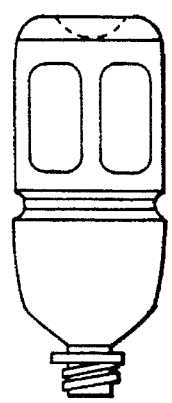

In the step of secondary blow-molding as shown in FIG. 14(A), the tertiary molded article 48 after the heating is blow-molded for being drawn by using a metal mold 47. It is desired that the secondary blow molding is carried out by using a gaseous pressure of from 15 to 40 kg/cm². In the case of the container that requires the heat resistance, furthermore, the temperature of the metal mold should be maintained to lie from about 70° to about 130° C. to prevent the molded article from quickly quenching during the secondary blow-molding. FIG. 14(B) illustrates the final molded article that is obtained.

Figure 15:
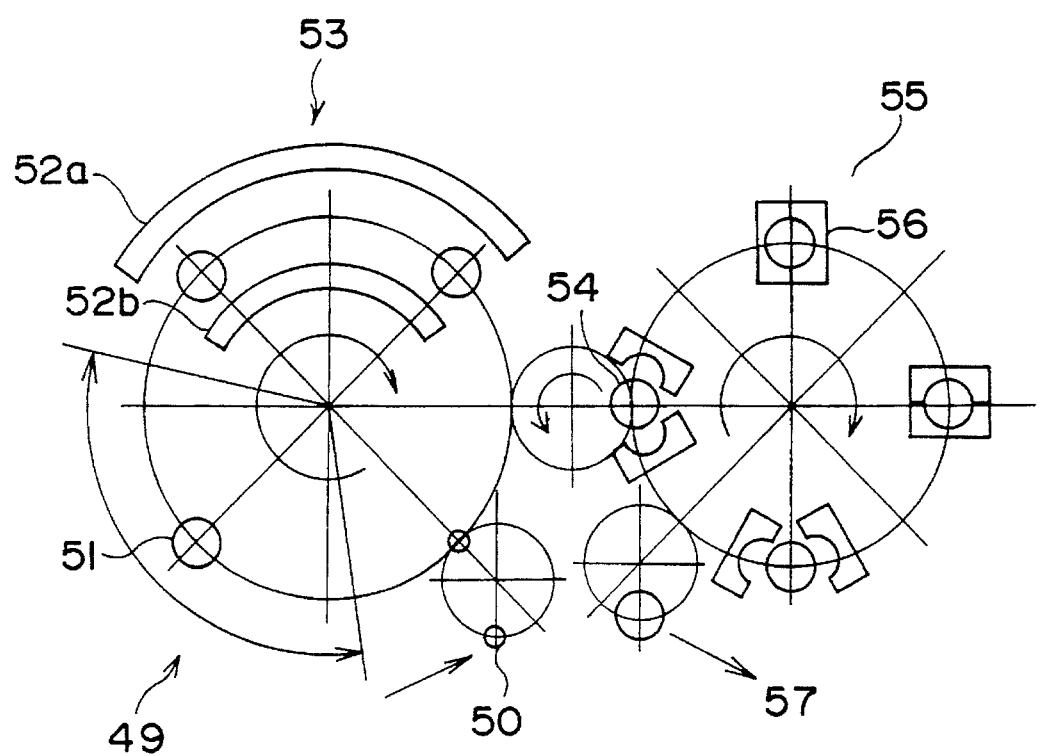
FIG. 15 is a diagram illustrating the whole arrangement of the apparatus according to Example 4 of the present invention.

FIG. 15 is a diagram illustrating an example of the apparatus for producing the biaxially drawn blow-molded containers according to the method of the present invention. In a step of the primary blow-molding based upon the free blow-molding system generally designated at 49, a preformed article 50 is fed to the step 49 of primary blow-molding to effect the blow-molding. A secondary molded article 51 then passes through a step of heat-setting 53 made up of a tunnel-like heating device constituted by a pair of infrared-ray heating members 52a and 52b facing the barrel portion. The secondary molded article 51 shrinks at its barrel portion and bottom portion in the direction of height and diameter, and is finally heated at the crystallization temperature to obtain a tertiary molded article 54. The tertiary molded article 54 is fed to a metal mold 56 for the secondary blow-molding in a step of secondary blow-molding that is generally designated at 55, and is subjected to the secondary blow-molding to obtain a final molded article 57. In this apparatus, the secondary molded article 51 is heat-set while it revolves and passes through the infrared-ray heating device 53 of the shape of a tunnel arranged along the circumference. The infrared-ray heating material constituting the infrared-ray heating device is divided into several portions along the circumference, and the temperatures of the divided portions can be separately adjusted such that the barrel portion and the bottom portion can be finally heated at a predetermined crystallization temperature.

According to the process of the present invention, the above-mentioned basic steps can be modified in a variety of ways.

Figure 16A:
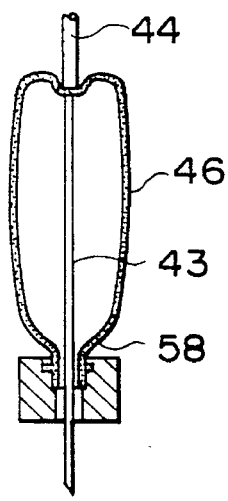
FIG. 16 is a diagram for explaining a further Example of the method of the present invention.

With reference to FIG. 16, the driving speed of the pushing rod and the drawing rod is controlled in the step of free-blow molding in order to form a dent at the center of the bottom of the secondary molded article.

That is, the driving speed of the pushing rod and the drawing rod is selected to be slightly smaller than the rising speed of the peripheral portions of the bottom in the blow-molding, thereby to obtain a secondary molded article having a dent at the center of the bottom. In this case, when the upwardly driving speed of the drawing rod 43 and the pushing rod 44 is very smaller than the blowing speed, the rising speed of the peripheral portions of the bottom is limited and the neck portion swells due to the blowing pressure. Therefore, the rising speed of the drawing rod 43 and the pushing rod 44 must be so adjusted that the neck portion 58 will not be excessively swollen (FIG. 16(A)).

Figure 16B:
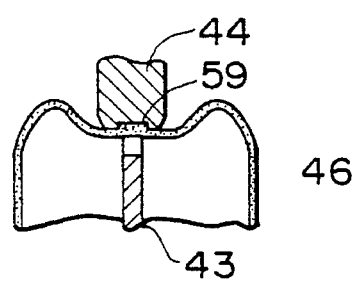

When the central portion of the bottom of the secondary molded article 46 is dented too greatly, the thickness varies greatly in the bottom portion which makes it difficult to thinly form the bottom. In such a case, an undrawn thick portion 59 is formed at the center on the bottom as shown in FIG. 16(B), and a tertiary molded article which is crystallized is obtained through the next step of heating maintaining the shape in which the central portion of the bottom is dented.

Figure 17A:
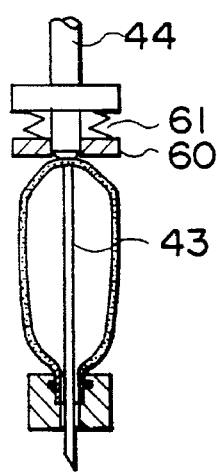
FIG. 17 is a diagram for explaining the step of molding using the pushing rod according to still further Example.
Figure 17B:
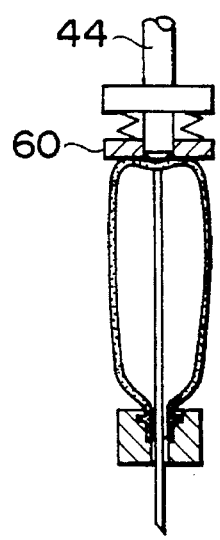
Figure 17C:
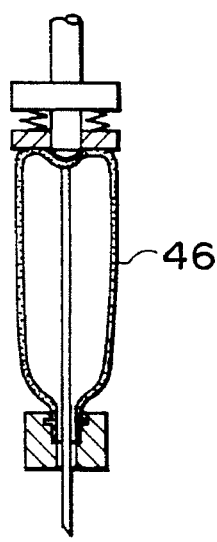

FIG. 17 illustrates an example of the constitution of the pushing rod. In this example, the pushing rod 44 is constituted by a pushing rod 44 having a protruded end, a support plate 60 surrounding it, and a spring 61 which downwardly biases the support plate.

When the free blow-molding is effected while pushing the central portion 61 of the bottom by the pushing rod, the protruded portion in the periphery of the bottom may locally swell. When the support plate 60 is provided surrounding the pushing rod 44 as shown in FIG. 17, however, the support plate 60 lightly holds the protruded portion; i.e., when the pushing rod 44 and the support plate 60 are raised, the protruded portion in the periphery of the bottom is uniformalized along the circumference.

The support plate 60 is maintained at a temperature 90° C. or higher) at which the blow-molding can be effected to heat the portion of the molded article that comes into contact with the support plate 60.

[Production Example 2]

By using the apparatus shown in FIG. 15, a polyethylene terephthalate (PET) bottle having heat resistance which is a finally molded article shown in FIG. 14(B) was prepared having an outer diameter of 94 mm, an overall height of 305 mm (height of the heating portion of 280 mm), and a capacity of 1500 ml, the bottom portion thereof being dented.

A predetermined preformed article was heated at 100° C., the mouth of the preformed article was secured by using a fixing fitting, and the free blow-molding was effected by blowing a fluid of a pressure of 3 kg/cm$^2$ into the preformed article in a state where the central portion of the bottom of the preformed article was sandwiched by a drawing rod having a teflon end inserted in the preformed article and a pushing rod having a protruded end which is heated at 100° C., in order to obtain a secondary molded article. The obtained secondary molded article possessed a stable shape having a relatively uniform and thick dome-like bottom with its central portion being drawn, the neck portion thereof without being substantially bent and the axis thereof without being deviated.

The secondary molded article was passed in a revolving manner through the tunnel-like infrared ray heating member that was divided into three zones along the circumference and of which the surface temperatures were controlled to be from 600° to 700° C. over a period of four seconds, in order to obtain a quaternary molded article having the barrel portion and the bottom portion which were finally heated at about 180° C. The quaternary molded article was subjected to the secondary blow-molding to obtain a final product. The final product was filled with the hot water of 95° C. to evaluate the heat resistance relying upon a change in the volume (a change in the volume of not larger than 2% is acceptable). Good results were obtained.

In the present invention, any plastic material can be used provided it can be drawn and blow-molded and can further be heat-set. There will be used a thermoplastic polyester and, particularly advantageously, an ethylene terephthalate-type thermoplastic polyester. It is of course allowable to use a polycarbonate and an arylate resin.

The ethylene terephthalate-type thermoplastic polyester used in the present invention is preferably the one in which most part and, usually, not smaller than 70 mol % and, particularly, not smaller than 80 mol % of the ester recurring units are occupied by an ethylene terephthalate unit, and having a glass transition point (Tg) of from 50° to 90° C. and, particularly, 55° to 80° C., and a melting point (Tm) of from 200° to 275° C. and, particularly, from 220° to 270° C.

A homopolyethylene terephthalate is preferred from the standpoint of heat resistance. It is, however, allowable to use a copolymerized polyester containing small amounts of ester units other than the ethylene terephthalate unit.

Examples of the dibasic acid other than the terephthalic acid include aromatic dicarboxylic acid such as isophthalic acid, phthalic acid, or naphthalene dicarboxylic acid; alicyclic dicarboxylic acid such as cyclohexane dicarboxylic acid or the like; aliphatic dicarboxylic acid such as succinic acid, adipic acid, sebacic acid, dodecanedioic acid or the like, which may be used in a single kind or in a combination of two or more kinds. The diol component other than the ethylene glycol may include one or two or more kinds of propylene glycol, 1,4-butane diol, diethylene glycol, 1,6-hexylene glycol, cyclohexane dimethanol, ethylene oxide addition product of bisphenol A, and the like.

The ethylene terephthalate-type thermoplastic polyester that is used should have a molecular weight that is at least large enough to form a film. Depending upon the applications, the ethylene terephthalate-type thermoplastic polyester has the injection grade or the extrusion grade. The intrinsic viscosity (I.V.) should generally be from 0.6 to 1.4 dl/g and, particularly, from 0.63 to 1.3 dl/g.

The plastic is molded into a preformed article by the injection molding. That is, the plastic is melt-injected into the injection mold that has been cooled, cooled, and is molded into a non-crystalline plastic preformed article.

As the injection machine, there can be used any known machine equipped with an injection plunger or a screw, and the mixture is injected into the injection mold through a nozzle, a sprue and a gate. Then, the polyester or the like flows into the cavity of the injection mold and is solidified to turn into a preformed article for being drawn and blow-molded.

The injection mold should have a cavity that corresponds to the shape of the container and is desirably the one of the one-gate type or the multi-gate type.

The injection temperature should be from 270° to 310° C. and the pressure should be from about 28 to about 110 kg/cm$^2$.

The preformed article can be draw/blow-molded by utilizing the heat given to the preformed article, i.e., by utilizing the remaining heat. As described in the foregoing Example, however, it is desired that the preformed article is once prepared, and the preformed article is heated at the above-mentioned drawing temperature to effect the drawing and blow-molding.

In the present invention, the secondary molded article is obtained by the free blow-molding. That is, the preformed article heated at a drawing temperature is pulled and drawn in the axial direction using the drawing rod and is, then, inflation-drawn in the circumferential direction by blowing a fluid without using the metal mold. The drawing ratio should be from 2 to 3.6 times as great and, particularly, from 2.2 to 3 times as great in the axial direction, and from 3 to 6.6 times as great and, particularly, from 3.5 to 6 times as great in the circumferential direction. The drawing ratio in the axial direction is determined by the length of the preformed article in the axial direction and by the length of stroke of the drawing rod. The drawing ratio in the circumferential direction is determined by the blowing pressure of the fluid.

When the free blow-molding is carried out by using the drawing rod and the pushing rod in combination, the drawing ratio should be from 2 to 5 times and, particularly, from 2.2 to 4 times in the axial direction and from 2.5 to 6.6 times and, particularly, from 3 to 6 times in the circumferential direction. In this case, the drawing ratios in the axial direction and in the circumferential direction are determined depending upon the shape of the preformed article and the blowing conditions such as the temperature for heating it, blow-molding pressure, and the mode of drawing by using the drawing rod. It is desired that the fluid pressure in the free blow-molding is usually from 2 to 10 kg/cm$^2$.

The planar infrared-ray radiation member used for heating the secondary molded article should generally be comprised of a cylindrical radiation heating member from the standpoint of heating efficiency.

It is desired that the diameter of the radiation surface is from 1.1 to 3 times as great as the diameter of the secondary molded article and the height of the radiation surface is more than one time (to 1.5 times) as great as the height of the secondary molded article.

The radiation surface can be constituted in a variety of ways. For instance, the surface may be a cylindrical surface or may be a plurality of small planar surfaces that are combined together to form a nearly cylindrical surface. In order to increase the radiation surface area, furthermore, the surface may be formed rugged.

It is further allowable to divide the cylindrical radiation member in the direction of height and adjust the radiation surface temperatures of the divided portions in order to control the distribution of radiant energy amounts on the surface of the secondary molded article in the direction of height.

The radiation surface can be constituted by using a ceramic having a relatively high radiation factor such as zirconia or alumina, a composite ceramic obtained by dispersing a graphite powder or a titanium powder in the zirconia, or by using a metal oxide film such as a stainless steel having a stable oxide film.

The radiation heating member can be heated by electromagnetic induction by using an electromagnetic induction coil provided on the outer side thereof. The cylindrical radiation heating member uses a spiral electromagnetic induction coil.

Moreover, linear heaters may be buried maintaining a suitable distance in an insulating material that constitutes a radiation surface to use it as a planar radiation heating member.

The infrared rays falling on the surface of the secondary molded article partly pass through the wall thereof, arrive at the inner surface on the opposite side facing the irradiated portion and where the infrared rays are further partly absorbed contributing to raising the temperature from the inside.

Upon heating the secondary molded article, the plastic constituting the container wall is crystallized and the residual stress decreases, making it possible to obtain a slightly shrunk container which is a tertiary molded article.

The fluid in the secondary molded article may be discharged during the heat treatment or the fluid which is pressurized to a small degree may be confined in the secondary molded article.

The tertiary molded article is inserted in the blow-molding metal mold and is subjected to the final blow-molding. Here, as a matter of fact, the cavity of the blow-molding metal mold must be larger than the tertiary molded article and must meet the size and shape of the final molded article.

The temperature of the final blow-molding has larger allowance than the temperature for the free draw/blow-molding and may be higher than, or lower than, the temperature for the free draw/blow-molding. Generally, however, the temperature of the final blow-molding is from 140° to 220° C.

Being crystallized by the heat treatment, furthermore, the tertiary molded article exhibits an increased modulus of elasticity. It is therefore desired to use a fluid pressure which is higher than that used for the free draw/blow-molding and which is usually from 15 to 40 kg/cm$^2$.

In the final blow-molding, the temperature of the metal mold may be maintained at 70° to 130° C. and may be cooled right after the molding, or may be cooled during the final molding by flowing the cold air or the like.

According to the present invention, the planar infrared-ray radiation member is used for heating the secondary molded article that is obtained by blow-molding the preformed article, so that the secondary molded article is heated at a temperature of, for example, 140° to 220° C. and that the plastic is crystallized to a high degree.

The planar infrared-ray radiation member has a large infrared-ray radiation area which is uniform and continuous, and makes it possible to uniformalize the amounts of infrared-ray radiant energy and at a high level on the surface of the secondary molded article.

In particular, by forming the planar infrared-ray radiation member in a cylindrical shape to surround the secondary molded article, the infrared rays falling on the surface of the secondary molded article partly pass through the wall thereof, arrive at the inner surface side on the opposite side facing the portion on where the rays fell and where the infrared rays are further partly absorbed contributing to raising the temperature from the inside. Therefore, a uniform and quick heating is carried out as a whole.

According to the present invention, furthermore, the preformed article is free blow-molded, i.e., blow-molded without using the metal mold to obtain a secondary molded article which has a relatively uniform thickness compared with the conventional molded articles obtained by using the metal mold. In particular, the thickness of the barrel portion and the bottom portion of the secondary molded article to be heated is maintained substantially uniformly to be not larger than 0.5 mm and, preferably, from 0.2 mm to 0.45 mm. Therefore, even through the heating for only a short period of time, the temperature distribution can be uniformalized to lie within a preferred temperature range in the direction of thickness.

According to the present invention, furthermore, a single metal mold is used for blow-molding to shorten the time occupied by the metal mold and to produce the bottles having excellent heat resistance maintaining high productivity.

When the preformed article is free blow-molded by locking the center of the bottom by using the drawing rod and the pushing rod, the secondary molded article is heat-shrunk in a preferred state without permitting the secondary molded article to be greatly bent at the neck portion or without permitting the axis to be deviated. By subjecting the secondary molded article (tertiary molded article or quaternary molded article) that is heated to the secondary blow-molding, furthermore, it is allowed to produce a biaxially drawn blow-molded container having excellent heat resistance and resistance against the heat and pressure.

Moreover, since the primary blow-molding is a free blow-molding system, there is no need of using the metal mold. Accordingly, the molded article is not cooled upon contact with the metal mold and can be easily handed over to the step of heat-setting.

Besides, the bottom portion of the molded container exhibits increased strength without permitting the walls to become locally thin but enabling the container to have a relatively uniform thickness, making it possible to reduce the weight.

We claim:

1. A process for producing biaxially drawn plastic bottles having excellent heat resistance comprising:

A. a step of biaxially drawing and free blow-molding a preformed article to form a secondary molded article having a biaxially drawn barrel portion and biaxially drawn bottom portion;

B. a step of heating and shrinking the secondary molded article in the infrared rays emitted from an infrared-ray radiation member that has at least one first substantially planar radiation surface having a height larger than that of the secondary molded article in the direction of height and facing the barrel portion of the secondary molded article and a second substantially planar radiation surface facing the bottom portion of the secondary molded article, in order to obtain a tertiary product, wherein each substantially planar radiation surface has a surface temperature of from 350° C. to 1000° C.; and C. a step of blow-molding the tertiary product that is in a heated state in a metal mold to obtain the bottle.

2. A process for production according to claim 1, wherein the amount of radiant energy of infrared rays emitted from the infrared-ray radiation member is from 1.0 to 20 W/cm$^2$ on the surface of the secondary molded article.

3. A process for production according to claim 1, wherein the secondary molded article is inserted in the infrared rays for a period of from 0.3 to 5 seconds in the step B.

4. A process for production according to claim 1, wherein the secondary molded article is heated at a temperature of from 140° to 220° C. in the step B such that the barrel portion and the bottom portion (excluding a gate portion) has a crystallinity of not smaller than 36%.

5. A process for production according to claim 1, wherein the preformed article is biaxially drawn in the step A such that the barrel portion and the bottom portion (excluding a gate portion) of the secondary molded article has a thickness that is less than 0.5 mm.

6. A process for production according to claim 1, wherein the preformed article is biaxially drawn and is free-blow molded in the step A by putting a drawing rod into the preformed article and blowing a pressurized fluid into the preformed article but without using a metal mold.

7. A process for production according to claim 1, wherein a mouth of the preformed article heated at the drawing temperature in the step A is held by a mouth-holding fitting, a drawing rod is driven toward the bottom portion in a state where the center of the bottom of the preformed article is sandwiched by the drawing rod put into the preformed article and a pushing rod on the outside of the preformed article, and the preformed article is free blow-molded by blowing a fluid into the preformed article in a state where the periphery of the preformed article is never in contact with a mold.

8. A process of production according to claim 7, wherein the driving speed of the drawing rod in the final stage or near the final stage of the free blow-molding is set to be slightly smaller than the inflation speed of the preformed article in the axial direction, in order to form a central portion in the bottom portion of the blow-molded article, the central portion in the bottom portion being recessed toward the inside.

9. A process for production according to claim 7, wherein the pushing rod has a protruded end which is heated at a temperature higher than the temperature for drawing the preformed article, and said protruded end is caused to bite into the central portion in the bottom portion of the preformed article in order to reduce the thickness of the central portion of the bottom portion.

10. A process for production according to claim 1, wherein the temperature of the metal mold is maintained at 60° to 130° C. in the step C.

* * * * *